United States Patent
Li et al.

(10) Patent No.: US 10,706,255 B2
(45) Date of Patent: Jul. 7, 2020

(54) PROCESSING METHOD AND ELECTRONIC DEVICE

(71) Applicant: Huawei Technologies Co., Ltd., Shenzhen (CN)

(72) Inventors: Xiaojuan Li, Beijing (CN); Wenmei Gao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 131 days.

(21) Appl. No.: 16/079,063

(22) PCT Filed: Feb. 24, 2016

(86) PCT No.: PCT/CN2016/074471
§ 371 (c)(1),
(2) Date: Aug. 22, 2018

(87) PCT Pub. No.: WO2017/143539
PCT Pub. Date: Aug. 31, 2017

(65) Prior Publication Data
US 2019/0026535 A1    Jan. 24, 2019

(51) Int. Cl.
*G06K 9/20*    (2006.01)
*G06K 9/00*    (2006.01)
(Continued)

(52) U.S. Cl.
CPC ....... *G06K 9/00087* (2013.01); *G06F 1/1643* (2013.01); *G06F 1/1694* (2013.01);
(Continued)

(58) Field of Classification Search
CPC .................................. G06K 9/00006–9/0012
See application file for complete search history.

(56) References Cited

U.S. PATENT DOCUMENTS

2007/0008066 A1*  1/2007  Fukuda ............... G06F 3/03547
340/5.52
2012/0071149 A1    3/2012  Bandyopadhyay et al.
(Continued)

FOREIGN PATENT DOCUMENTS

CN    103399642 A    11/2013
CN    103677633 A     3/2014
(Continued)

OTHER PUBLICATIONS

Huawei Honor 7i—Full phone specifications, Retrieved from internet https://www.gsmarena.com/huawei_honor_7i-7510.php on Dec. 1, 2018, total 2 pages.
(Continued)

*Primary Examiner* — Brian Werner
(74) *Attorney, Agent, or Firm* — Slater Matsil, LLP

(57) ABSTRACT

In a processing method, an electronic device may detect, in a locked state, an operation performed on a fingerprint sensor, and determine a result of matching a fingerprint collected by the fingerprint sensor with a preset fingerprint, where the matching result is matching or not matching. When an included angle between a direction of a screen and a gravity direction falls beyond a preset range, the electronic device skips executing a response corresponding to the matching result. When an included angle between a direction of a screen and a gravity direction falls within a preset range, the electronic device executes a response corresponding to the matching result.

21 Claims, 18 Drawing Sheets

(51) Int. Cl.
    *G06F 3/048*     (2013.01)
    *G06F 21/32*     (2013.01)
    *G06F 1/16*     (2006.01)
    *H04L 9/32*     (2006.01)
    *G06F 3/041*     (2006.01)

(52) U.S. Cl.
    CPC ............ *G06F 3/048* (2013.01); *G06F 3/0412* (2013.01); *G06F 21/32* (2013.01); *H04L 9/3231* (2013.01); *G06K 2009/0006* (2013.01)

(56) References Cited

U.S. PATENT DOCUMENTS

| | | |
|---|---|---|
| 2013/0294660 A1 | 11/2013 | Heilpern |
| 2014/0219520 A1* | 8/2014 | Myers ............... G06K 9/00087 382/124 |
| 2014/0302818 A1 | 10/2014 | Fyke |
| 2015/0127965 A1 | 5/2015 | Hong et al. |
| 2016/0217313 A1* | 7/2016 | Cuti ...................... G06F 3/0488 |
| 2017/0213019 A1* | 7/2017 | Mao ....................... G06F 21/32 |
| 2017/0285868 A1 | 10/2017 | Gan et al. |
| 2019/0392422 A1* | 12/2019 | Yim ...................... H04M 1/725 |

FOREIGN PATENT DOCUMENTS

| | | |
|---|---|---|
| CN | 104541231 A | 4/2015 |
| CN | 104933339 A | 9/2015 |
| CN | 105117626 A | 12/2015 |
| CN | 105227754 A | 1/2016 |
| CN | 105279402 A | 1/2016 |

OTHER PUBLICATIONS

ZTE nubia Z9—Full phone specifications, Retrieved from internet https://www.gsmarena.com/zte_nubia_z9-7207.php on Dec. 1, 2018, total 2 pages.

* cited by examiner

PROCESSING METHOD AND ELECTRONIC DEVICE

CROSS-REFERENCE TO RELATED APPLICATIONS

This application claims the benefit of, and is a national stage of International Application No. PCT/CN2016/074771, filed on Feb. 24, 2016, which is hereby incorporated herein by reference in its entirety.

TECHNICAL FIELD

The present invention relates to the field of information processing technologies, and in particular, to a processing method and an electronic device.

BACKGROUND

Currently, a fingerprint sensor is disposed at a designated position (for example, a side edge or a rear side) of an electronic device. When the electronic device is in a locked state and the electronic device matches a fingerprint collected by the fingerprint sensor with a preset fingerprint, the electronic device may exit the locked state. In daily life, a user easily touches the fingerprint sensor by mistake when holding the electronic device during running, walking, or the like. The electronic device obtains, by means of fingerprint recognition, a result of matching the fingerprint collected by the fingerprint sensor with the preset fingerprint, and executes a response corresponding to the matching result. However, the user does not expect the response to be executed in a practical operation process.

SUMMARY

This specification provides a processing method and an electronic device, so as to resolve a technical problem of a response caused due to accidental touch of a fingerprint sensor.

A first aspect provides a processing method, and the method is applied to an electronic device having a fingerprint sensor and a screen. The method includes, when the electronic device is in a locked state, detecting an operation performed on the fingerprint sensor. The method also includes determining a result of matching a fingerprint collected by the fingerprint sensor with a preset fingerprint, where the matching result is matching or not matching. The method further includes, when an included angle between a direction of the screen and a gravity direction falls beyond a preset range, skipping executing a response corresponding to the matching result; or when an included angle between a direction of the screen and a gravity direction falls within a preset range, executing a response corresponding to the matching result.

In a conventional processing method, after collecting the fingerprint by using the fingerprint sensor, the electronic device obtains the matching result after matching the collected fingerprint with the preset fingerprint. The electronic device directly executes the response corresponding to the matching result. For example, the electronic device exits the locked state or outputs prompt information, so as to indicate that the fingerprint collected by the fingerprint sensor does not match the preset fingerprint. A user easily touches the fingerprint sensor by mistake because the fingerprint sensor is integrated into an outer side or a rear side of the electronic device. Consequently, the electronic device executes the response corresponding to the matching result. However, the user does not expect the response to be executed in a practical operation process. In this technical solution, the operation performed on the fingerprint sensor is detected, and the result of matching the fingerprint collected by the fingerprint sensor with the preset fingerprint is determined. When the included angle between the direction of the screen and the gravity direction falls beyond the preset range, it indicates that the user accidentally touches the fingerprint sensor, and the electronic device skips executing the response corresponding to the matching result, so as to reduce power consumption of the electronic device.

A schematic interface diagram of an included angle between a direction of a screen and a gravity direction shown in FIG. 2b is used as an example. A three-dimensional coordinate system may be established, and the gravity direction always points to the ground. In this case, the gravity direction may be set as a positive direction of a Z axis. The direction of the screen is a direction from the rear side of the electronic device to the screen. The included angle between the direction of the screen and the gravity direction may be defined by setting a turning angle at which the direction of the screen turns to the gravity direction counterclockwise (or clockwise). In an example of an electronic device shown in FIG. 2c, the direction of the screen is a negative direction of a Z axis when the screen of the electronic device faces upward in a horizontal direction. In an example of an electronic device shown in FIG. 2d, the direction of the screen is a positive direction of a Z axis when the screen of the electronic device faces downward in a horizontal direction. In an example of an electronic device shown in FIG. 2e, the direction of the screen is a negative direction of an X axis when the screen of the electronic device faces leftward in a vertical direction. In an example of an electronic device shown in FIG. 2f, the direction of the screen is a positive direction of an X axis when the screen of the electronic device faces rightward in a vertical direction. The preset range of the included angle between the direction of the screen and the gravity direction may be set to be not less than 90 degrees and not greater than 180 degrees; or may be set to be not less than 0 degree and not greater than 180 degrees; or may be set to be not less than 0 degree and not greater than 360 degrees; or may be set as another angle range. When the screen of the electronic device faces downward in a horizontal direction, the included angle between the direction of the screen and the gravity direction is 0 degree. When the screen of the electronic device faces leftward in a vertical direction, the included angle between the direction of the screen and the gravity direction is 90 degrees. When the screen of the electronic device faces upward in a horizontal direction, the included angle between the direction of the screen and the gravity direction is 180 degrees. When the screen of the electronic device faces rightward in a vertical direction, the included angle between the direction of the screen and the gravity direction is 270 degrees.

In a possible design, the executing a response corresponding to the matching result may specifically include: when the matching result is matching, exiting the locked state; or when the matching result is not matching, outputting prompt information, where the prompt information is used to indicate that the fingerprint collected by the fingerprint sensor does not match the preset fingerprint.

In a possible design, after the included angle between the direction of the screen and the gravity direction falls beyond the preset range, the method further includes: obtaining acceleration values of the electronic device on an X axis, a Y axis, and a Z axis by using an acceleration sensor; and when each of the three obtained acceleration values is less than a corresponding preset acceleration threshold, skipping executing the response corresponding to the matching result; or when any of the three obtained acceleration values is not less than a corresponding preset acceleration threshold, executing the response corresponding to the matching result.

Generally, when a user needs to use the electronic device, the user usually picks up the electronic device. For example, the electronic device is picked up from a desktop or taken out from a bag. The electronic device may count the acceleration values of the electronic device on the X axis, the Y axis, and the Z axis in a process of picking up the electronic device by the user; determine a preset acceleration threshold on the X axis according to an acceleration value on the X axis obtained by means of counting; determine a preset acceleration threshold on the Y axis according to an acceleration value of the Y axis obtained by means of counting; and determine a preset acceleration threshold on the Z axis according to an acceleration value on the Z axis obtained by means of counting.

In this technical solution, to improve precision of determining whether the user accidentally touches the fingerprint sensor, when the included angle between the direction of the screen and the gravity direction falls beyond the preset range, the electronic device may obtain the acceleration values of the electronic device on the X axis, the Y axis, and the Z axis by using the acceleration sensor. When the acceleration value on the X axis is not less than the preset acceleration threshold on the X axis, or when the acceleration value on the Y axis is not less than the preset acceleration threshold on the Y axis, or when the acceleration value on the Z axis is not less than the preset acceleration threshold on the Z axis, it indicates that the user does not accidentally touch the fingerprint sensor, and then the response corresponding to the matching result is executed. When the acceleration value on the X axis is less than the preset acceleration threshold on the X axis, the acceleration value on the Y axis is less than the preset acceleration threshold on the Y axis, and the acceleration value on the Z axis is less than the preset acceleration threshold on the Z axis, it indicates that the user accidentally touches the fingerprint sensor, and then the response corresponding to the matching result is not executed.

In a possible design, the electronic device may further update the preset range correspondingly according to a status of the electronic device. For example, when it is detected that the electronic device is in a motion state (for example, the user holding the electronic device is walking, running, or riding), the electronic device uses a first preset range [90°, 180°]; or when it is detected that the electronic device is in a stationary state, the electronic device uses a second preset range [0°, 270°]. The status of the electronic device may be classified in another manner, and a corresponding preset range may be set. This is not intended to limit the present invention.

Generally, when the user uses the electronic device in a prone posture, a status of holding the electronic device is usually as follows: the screen faces upward in a horizontal direction or is inclined at a particular angle, that is, the included angle between the direction of the screen and the gravity direction is approximately 180 degrees. When the user uses the electronic device in a side-lying posture, a status of holding the electronic device is usually as follows: the screen faces leftward or rightward in a vertical direction (or is inclined at a particular angle), that is, the included angle between the direction of the screen and the gravity direction is approximately 90 degrees or 270 degrees. When the user uses the electronic device in a supine posture, a status of holding the electronic device is usually as follows: the screen faces downward in a horizontal direction or is inclined at a particular angle, that is, the included angle between the direction of the screen and the gravity direction is approximately 0 degree or 360 degrees. When the user uses the electronic device in a walking, running, standing, or sitting posture, a status of holding the electronic device is usually as follows: the included angle between the direction of the screen and the gravity direction falls between 90 degrees and 180 degrees.

In a possible design, the electronic device may further update the preset range correspondingly according to a posture (for example, a walking, running, standing, sitting, side-lying, prone, or supine posture) of the user holding the electronic device. For example, when the electronic device detects that the user holding the electronic device is in a walking, running, standing, or sitting posture, the electronic device uses a first preset range [90°, 180°]; when the electronic device detects that the user holding the electronic device is in a prone posture, the electronic device uses a second preset range [180°−deviation value, 180°+deviation value]; when the electronic device detects that the user holding the electronic device is in a supine posture, the electronic device uses a third preset range [0°−deviation value, 0°+deviation value] and/or [360°−deviation value, 360°+deviation value]; or when the electronic device detects that the user holding the electronic device is in a side-lying posture, the electronic device uses a fourth preset range [90°−deviation value, 90°+deviation value] and/or [270°−deviation value, 270°+deviation value]. The posture of the user holding the electronic device may be classified in another manner, a corresponding preset range may be set, and a deviation value may be 15° or 30°, or may be another value. This is not intended to limit the present invention. Preset ranges may be different, or may be partially the same, or may be totally different. This is not specifically limited in this embodiment of the present invention. It should be noted that the preset range in this embodiment of the present invention includes but is not limited to four preset ranges. For example, the preset range may be [180°−first preset angle, 180°+first preset angle]. For example, the preset range may be [150°, 210°]. For another example, the preset range may include a first preset range and a second preset range, the first preset range may be [0°, first preset angle] and [360°−first preset angle, 360°], and the second preset range may be [180°−third preset angle, 180°+third preset angle]. For example, the first preset range may be [0°, 30°] and [330°, 360°], and the second preset range may be [150°, 210°]. This is not specifically limited in this embodiment of the present invention.

In a possible design, the included angle between the direction of the screen and the gravity direction is determined by using data collected by at least one of a geomagnetic sensor, an angular velocity sensor, or the acceleration sensor.

In a possible design, after the skipping executing a response corresponding to the matching result, the method further includes: when a quantity of operations detected in preset duration and performed on the fingerprint sensor exceeds a preset quantity value, determining a matching result of the operation detected in the preset duration; and when the matching result is matching, executing a response corresponding to the matching.

In this technical solution, if the electronic device detects, in the preset duration, multiple operations performed on the fingerprint sensor, it indicates that the user expects the response corresponding to the matching result to be executed; however, the electronic device determines, by mistake, that the user accidentally touches the fingerprint sensor. To improve processing efficiency, when the quantity of operations detected in the preset duration and performed on the fingerprint sensor exceeds the preset quantity value, the electronic device may determine the matching result of the operation detected in the preset duration; and when the matching result is matching, execute the response corresponding to the matching.

In a possible design, after the skipping executing a response corresponding to the matching result, the method further includes: when a quantity of operations detected in preset duration and performed on the fingerprint sensor exceeds a preset quantity value, determining a matching result of a last operation detected in the preset duration; and executing a response corresponding to the matching result of the last operation.

In this technical solution, when the quantity of operations detected in the preset duration and performed on the fingerprint sensor exceeds the preset quantity value, it indicates that the user expects the response corresponding to the matching result to be executed, and the electronic device may determine the matching result of the last operation detected in the preset duration, and execute the response corresponding to the matching result of the last operation, so as to improve processing efficiency.

A second aspect further provides a processing method, and the method is applied to an electronic device having a fingerprint sensor, a camera, and a screen. The method includes, when the electronic device is in a locked state, detecting an operation performed on the fingerprint sensor. The method also includes determining a result of matching a fingerprint collected by the fingerprint sensor with a preset fingerprint, where the matching result is matching or not matching. The method further includes, when an image obtained by the camera does not include a preset face, skipping executing a response corresponding to the matching result; or when an image obtained by the camera includes a preset face, executing a response corresponding to the matching result.

In this technical solution, when the image obtained by the camera includes the preset face, it indicates that a user is using the electronic device currently, and the user does not accidentally touch the fingerprint sensor, and then the electronic device executes the response corresponding to the matching result. When the image obtained by the camera does not include the preset face, it indicates that a user does not use the electronic device currently, and the user accidentally touches the fingerprint sensor, and then the response corresponding to the matching result may not be executed. Therefore, resource utilization can be improved, and power consumption of the electronic device can be reduced.

The preset face may be pre-stored by the electronic device. For example, the electronic device may obtain a face of an owner of the electronic device by using the camera, and store the obtained face of the owner in a memory as the preset face. A schematic interface diagram of an image shown in FIG. 2k is used as an example. After detecting the operation performed on the fingerprint sensor, the electronic device obtains the image by using the camera; performs facial recognition on the image obtained by the camera; and when the image includes a face, determines whether the face included in the image matches the preset face. When the face included in the image matches the preset face, it indicates that the owner of the electronic device is using the electronic device currently, and the response corresponding to the matching result may be executed. When the image does not include a face or when a face included in the image does not match the preset face, it indicates that the owner of the electronic device does not use the electronic device currently, and the response corresponding to the matching result may not be executed.

A third aspect further provides a processing method, and the method is applied to an electronic device having a fingerprint sensor, an infrared sensor, and a screen. The method includes, when the electronic device is in a locked state, detecting an operation performed on the fingerprint sensor. The method also includes determining a result of matching a fingerprint collected by the fingerprint sensor with a preset fingerprint, where the matching result is matching or not matching. The method also includes transmitting an infrared ray by using the infrared sensor. The method further includes, when a reflected infrared ray is not received, skipping executing a response corresponding to the matching result; or when a reflected infrared ray is received, executing a response corresponding to the matching result.

In this technical solution, the electronic device transmits the infrared ray by using the infrared sensor. When a user is in an infrared transmission area, the infrared ray transmitted to the user is reflected to the electronic device, and the electronic device may receive the reflected infrared ray. It indicates that the user is using the electronic device currently, and the user does not accidentally touch the fingerprint sensor, and then the response corresponding to the matching result may be executed. When the electronic device does not receive the reflected infrared ray, it indicates that the user does not use the electronic device currently, and the user accidentally touches the fingerprint sensor, and then the response corresponding to the matching result may not be executed. Therefore, resource utilization can be improved, and power consumption of the electronic device can be reduced.

A fourth aspect further provides an electronic device, and the electronic device includes units configured to perform the method according to any one of the first aspect or all possible designs of the first aspect.

A fifth aspect further provides an electronic device, including one or more processors, a memory, a bus system, a fingerprint sensor, a screen, and one or more programs. The processor, the memory, the fingerprint sensor, and the screen are connected to each other by using the bus system, the one or more programs are stored in the memory, the one or more programs include an instruction, and when the instruction is executed by the electronic device, the electronic device performs the method according to any one of the first aspect or all possible designs of the first aspect.

A sixth aspect further provides a graphical user interface on an electronic device. The electronic device includes a display, a fingerprint sensor, a memory, multiple application programs, and one or more processors configured to execute one or more programs stored in the memory, the graphical user interface includes a user interface displayed in the method according to any one of the first aspect or all possible designs of the first aspect, and the display includes a touch-sensitive surface and a screen.

A seventh aspect further provides a computer readable storage medium storing one or more programs, the one or more programs include an instruction, and when the instruction is executed by an electronic device, the electronic device performs the method according to any one of the first aspect or all possible designs of the first aspect.

An eighth aspect further provides an electronic device, and the electronic device includes units configured to perform the method according to any one of the second aspect or all possible implementations of the second aspect.

A ninth aspect further provides an electronic device, including one or more processors, a memory, a bus system, a fingerprint sensor, a camera, a screen, and one or more programs. The processor, the memory, the fingerprint sensor, the camera, and the screen are connected to each other by using the bus system. The one or more programs are stored in the memory. The one or more programs include an instruction, and when the instruction is executed by the electronic device, the electronic device performs the method according to any one of the second aspect or all possible designs of the second aspect.

A tenth aspect further provides a graphical user interface on an electronic device. The electronic device includes a display, a fingerprint sensor, a camera, a memory, multiple application programs, and one or more processors configured to execute one or more programs stored in the memory, the graphical user interface includes a user interface displayed in the method according to any one of the second aspect or all possible designs of the second aspect, and the display includes a touch-sensitive surface and a screen.

An eleventh aspect further provides a computer readable storage medium storing one or more programs, the one or more programs include an instruction, and when the instruction is executed by an electronic device, the electronic device performs the method according to any one of the second aspect or all possible designs of the second aspect.

A twelfth aspect further provides an electronic device, and the electronic device includes units configured to perform the method according to any one of the third aspect or all possible implementations of the third aspect.

A thirteenth aspect further provides an electronic device, including one or more processors, a memory, a bus system, a fingerprint sensor, an infrared sensor, a screen, and one or more programs. The processor, the memory, the fingerprint sensor, the infrared sensor, and the screen are connected to each other by using the bus system. The one or more programs are stored in the memory, the one or more programs include an instruction, and when the instruction is executed by the electronic device, the electronic device performs the method according to any one of the third aspect or all possible designs of the third aspect.

A fourteenth aspect further provides a graphical user interface on an electronic device. The electronic device includes a display, a fingerprint sensor, a memory, multiple application programs, and one or more processors configured to execute one or more programs stored in the memory, the graphical user interface includes a user interface displayed in the method according to any one of the third aspect or all possible designs of the third aspect, and the display includes a touch-sensitive surface and a screen.

A fifteenth aspect further provides a computer readable storage medium storing one or more programs, the one or more programs include an instruction, and when the instruction is executed by an electronic device, the electronic device performs the method according to any one of the third aspect or all possible designs of the third aspect.

BRIEF DESCRIPTION OF THE DRAWINGS

To describe embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
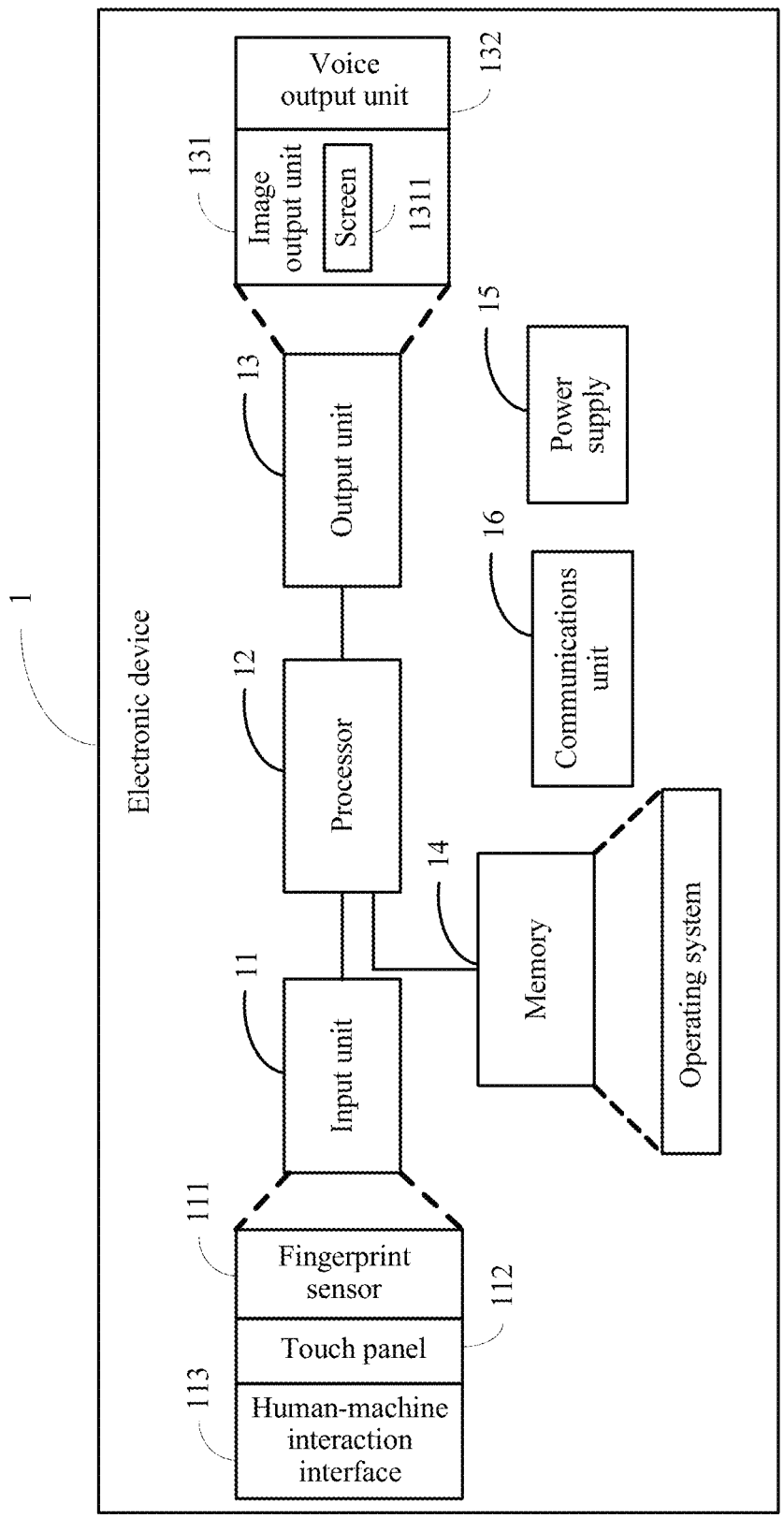
FIG. 1 is a schematic structural diagram of an electronic device according to an embodiment of the present invention.

An electronic device provided in an embodiment of the present invention may be shown in FIG. 1. An electronic device 1 includes components such as an input unit 11, at least one processor 12, an output unit 13, a memory 14, a power supply 15, and a communications unit 16. These components perform communication by using one or more buses.

A person skilled in the art may understand that a structure of the electronic device shown in the diagram does not constitute a limitation on the present invention. The structure may be a bus structure or a star structure, and may include more or fewer parts than those shown in the diagram, or combine some parts, or have different part arrangements. In this implementation of the present invention, the electronic device 1 may be any mobile or portable electronic device; and includes but is not limited to a mobile phone, a mobile computer, a tablet computer, a personal digital assistant (Personal Digital Assistant, PDA for short), a media player, a smart television, and a combination of the foregoing two or more items.

The input unit 11 is configured to implement interaction between a user and the electronic device 1 and/or input information to the electronic device 1. For example, the input unit 11 may receive digit or character information entered by the user, so as to generate signal input related to user setting or function control. In a specific implementation of the present invention, the input unit 11 includes at least a fingerprint sensor 111. The input unit 11 may further include a touch panel 112 and/or another human-machine interaction interface 113, such as a camera, an acceleration sensor, a geomagnetic sensor, an angular velocity sensor, or an infrared sensor.

The touch panel 112 is also referred to as a touchscreen or a touch control screen, and may collect an operation action of touching or approaching performed by the user on the touch panel, for example, an operation action performed by the user on the touch panel 112 or near the touch panel 112 by using any proper object or accessory such as a finger or a stylus; and drive a corresponding connection apparatus according to a preset program. Optionally, the touch panel 112 may include two parts: a touch detection apparatus and a touch controller. The touch detection apparatus detects a touch operation of the user, converts the detected touch operation into an electrical signal, and transmits the electrical signal to the touch controller. The touch controller receives the electrical signal from the touch detection apparatus, converts the electrical signal into touch point coordinates, and then transmits the touch point coordinates to the processor 12. The touch controller may further receive and execute a command sent by the processor 12. In addition, the touch panel 112 may be implemented in multiple types, such as a resistive type, a capacitive type, an infrared (Infrared) ray type, and a surface acoustic wave type. In another implementation of the present invention, an substantive input key used by the input unit 11 may include but is not limited to one or more of a physical keyboard, a function button (such as a volume control button or a switch button), a trackball, a mouse, or a joystick. The input unit 11 in a microphone form may collect a voice that is input by the user or an environment; and convert the voice to a command that is in a form of an electrical signal and that can be executed by the processor 12.

The processor 12 is a control center of the electronic device 1; is connected to various parts of the entire electronic device 1 by using various interfaces and lines; and executes various functions of the electronic device 1 and/or processes data by running or executing a software program and/or a module stored in the memory 14 and invoking data stored in the memory 14. The processor 12 may include an integrated circuit (IC). For example, the processor 12 may include a single packaged IC, or may include multiple packaged ICs that are connected and with a same function or different functions. For example, the processor 12 may include only a central processing unit (CPU), or may be a combination of a GPU, a digital signal processor (DSP), and a control chip (for example, a baseband chip) in the communications unit 16. In this implementation of the present invention, the CPU may be a single computing core, or may include multiple computing cores.

The output unit 13 includes but is not limited to an image output unit 131 and a voice output unit 132. The image output unit 131 is configured to output prompt information. The prompt information may be a text, a picture, and/or a video. The voice output unit 132 may be a vibration sensor, a microphone, or the like; and is configured to output prompt information. The prompt information may be vibration, a ringtone, or the like. The image output unit 131 in this embodiment of the present invention may include at least a screen 1311, for example, a screen configured in a form of a liquid crystal display (LCD), an organic light-emitting diode (OLED), or a field emission display (FED). Alternatively, the image output unit 131 may include a reflective display, for example, an electrophoretic display, or a display using an interferometric modulation of light technology. The image output unit 131 may include a single display or multiple displays of different sizes. In a specific implementation of the present invention, the touch panel 112 used by the input unit 11 and the screen 1311 used by the output unit 13 may be collectively referred to as a display. After detecting a gesture operation of touching or approaching on the touch panel, the touch panel 112 transmits the gesture operation to the processor 12 to determine a type of a touch event, and then the processor 12 provides corresponding visual output on the screen 1311 according to the type of the touch event. In FIG. 1, though the input unit 11 and the output unit 13 are used as two independent parts to implement input and output functions of the electronic device 1, in some embodiments, the touch panel 112 and the screen 1311 may be integrated to implement the input and output functions of the electronic device 1. For example, the image output unit 131 may display various graphical user interfaces (GUI) as virtual control components, including but not limited to a window, a scrollbar, an icon, and a scrapbook, so that the user performs an operation in a touch manner.

In a specific implementation of the present invention, the image output unit 131 includes a filter and an amplifier that are configured to filter and amplify a video output by the processor 12. The voice output unit 132 includes a digital-to-analog converter that is configured to convert an audio signal output by the processor 12 from a digital format to an analog format.

The memory 14 may be configured to store a software program and a module, and the processor 12 executes various function applications of the electronic device 1 and implements data processing by running the software program and the module stored in the memory 14. The memory 14 mainly includes a program storage area and a data storage area. The program storage area may store an operating system, an application program required by at least one function, such as a sound playback program or an image playback program. The data storage area may store data (such as audio data or a phonebook) created according to use of the electronic device 1, and the like. In a specific implementation of the present invention, the memory 14 may include a volatile memory, such as a nonvolatile random access memory (NVRAM), a phase change random access memory (PRAM), or a magnetoresistive random access memory (MRAM); or may include a non-volatile memory, such as at least one magnetic disk storage device, an electrically erasable programmable read-only memory (EEPROM), or a flash storage device such as an NOR flash memory or an NAND flash memory. The non-volatile memory stores the operating system and the application program that are executed by the processor. The memory 14 loads, from the non-volatile memory, a running program and data to memory space, and stores digital content in a massive storage apparatus. The operating system includes various components and/or drivers that are configured to control and manage a regular system task, such as memory management, storage device control, or power management, and that facilitate communication between all kinds of software and hardware. In this implementation of the present invention, the operating system may be an Android system of Google, an iOS system developed by Apple, a Windows operating system developed by Microsoft, or the like; or may be an embedded operating system such as Vxworks.

The application program includes any application installed on the electronic device, and includes but is not limited to a browser, an email, an instant messaging service, word processing, keyboard virtualization, a window widget, encryption, digital right management, voice recognition, voice duplication, positioning (such as a function provided by a Global Positioning System), music playback, and the like.

The power supply 15 is configured to supply power to different parts of the electronic device 1 to maintain running. Generally, the power supply may be a built-in battery, for example, a common lithium-ion battery or a NiMH battery; or includes an external power supply that directly supplies power to the electronic device, for example, an AC adapter. In some implementations of the present invention, the power supply may also be defined in a wider scope. For example, the power supply may further include a power management system, a charging system, a power failure detection circuit, a power converter or inverter, a power status indicator (such as a light emitting diode), and any other components related to power generation, management, and distribution of the electronic device.

The communications unit 16 is configured to establish a communications channel, so that the electronic device 1 is connected to a remote server by using the communications channel, and downloads media data from the remote server. The communications unit 16 may include a communications module such as a wireless local area network (WLAN) module, a Bluetooth module, or a baseband module, and a radio frequency (RF) circuit corresponding to the communications module; and is configured to perform wireless local area network communication, Bluetooth communication, infrared communication and/or cellular communications system communication, such as wideband code division multiple access (WCDMA) and/or high speed downlink packet access (HSDPA). The communications module is configured to control communication between components in the electronic device, and may support direct memory access.

In different implementations of the present invention, various communications modules in the communications unit 16 generally exist in a form of an integrated circuit chip, and may be combined selectively without a need of including all communications modules and corresponding antenna groups. For example, the communications unit 16 may include only a baseband chip, a radio frequency chip, and a corresponding antenna, so as to provide a communication function in a cellular communications system. The communications unit 16 establishes a wireless communication connection, for example, wireless local area network access or WCDMA access. The electronic device 1 may be connected to a cellular network or the Internet. In some optional implementations of the present invention, the communications module in the communications unit 16, for example, a baseband module, may be integrated into the processor 12. The processor 12 is typically an APQ+MDM family of platforms provided by Qualcomm.

The radio frequency circuit is configured to receive and send information, or receive and send a signal during a call. For example, after receiving downlink information of a base station, the radio frequency circuit sends the downlink information to the processor 12 for processing; and sends uplink data to the base station. Generally, the radio frequency circuit includes a public circuit configured to execute these functions; and includes but is not limited to an antenna system, a radio frequency transceiver, one or more amplifiers, a tuner, one or more oscillators, a digital signal processor, a codec chip set, a subscriber identity module (SIM) card, a memory, and the like. In addition, the radio frequency circuit may further communicate with a network and another device by means of wireless communication. Any communications standard or protocol may be used for the wireless communication, including but not limited to a Global System for Mobile Communications (GSM), a general packet radio service (GPRS), Code Division Multiple Access (CDMA), Wideband Code Division Multiple Access (WCDMA), a high speed uplink packet access (HSUPA) technology, Long Term Evolution (LTE), an email, a short message service (SMS), and the like.

In a possible implementation, the processor 12 detects, when the electronic device 1 is in a locked state, an operation performed on the fingerprint sensor in. The processor 12 determines a result of matching a fingerprint collected by the fingerprint sensor in with a preset fingerprint. The matching result is matching or not matching. When an included angle between a direction of the screen 1311 and a gravity direction falls beyond a preset range, the processor 12 skips executing a response corresponding to the matching result; or when an included angle between a direction of the screen 1311 and a gravity direction falls within a preset range, the processor 12 executes a response corresponding to the matching result.

Optionally, that the processor 12 executes a response corresponding to the matching result includes: when the matching result is matching, the processor 12 exits the locked state; or when the matching result is not matching, the output unit 13 outputs prompt information, where the prompt information is used to indicate that the fingerprint collected by the fingerprint sensor does not match the preset fingerprint.

Optionally, the processor 12 may perform the following operations: when the included angle between the direction of the screen 1311 and the gravity direction falls beyond the preset range, obtaining acceleration values of the electronic device 1 on an X axis, a Y axis, and a Z axis by using an acceleration sensor; and when each of the three obtained acceleration values is less than a corresponding preset acceleration threshold, skipping executing the response corresponding to the matching result; or when any of the three obtained acceleration values is not less than a corresponding preset acceleration threshold, executing the response corresponding to the matching result.

Optionally, the included angle between the direction of the screen 1311 and the gravity direction is determined by using data collected by at least one of a geomagnetic sensor, an angular velocity sensor, or the acceleration sensor.

Optionally, after that the processor 12 skips executing a response corresponding to the matching result, the method further includes: when a quantity of operations detected in preset duration and performed on the fingerprint sensor exceeds a preset quantity value, determining, by the processor 12, a matching result of the operation detected in the preset duration; and when the matching result is matching, executing a response corresponding to the matching.

Optionally, after that the processor 12 skips executing a response corresponding to the matching result, the method further includes: when a quantity of operations detected in preset duration and performed on the fingerprint sensor exceeds a preset quantity value, determining, by the processor 12, a matching result of a last operation detected in the preset duration; and executing a response corresponding to the matching result of the last operation.

It can be understood that in this implementation, functions of all function modules of the electronic device 1 may be specifically implemented according to the method in the method embodiment shown in FIG. 3, FIG. 6, FIG. 7, or FIG. 9A and FIG. 9B; and may be specifically corresponding to related descriptions in FIG. 3, FIG. 6, FIG. 7, or FIG. 9A and FIG. 9B. Details are not described herein again.

In a possible implementation, the processor 12 detects, when the electronic device 1 is in a locked state, an operation performed on the fingerprint sensor in. The processor 12 determines a result of matching a fingerprint collected by the fingerprint sensor in with a preset fingerprint. The matching result is matching or not matching. When an image obtained by a camera does not include a preset face, the processor 12 skips executing a response corresponding to the matching result; or when an image obtained by a camera includes a preset face, the processor 12 executes a response corresponding to the matching result.

It can be understood that in this implementation, functions of all function modules of the electronic device 1 may be specifically implemented according to the methods in the method embodiments shown in FIG. 4, FIG. 6, FIG. 8, and FIG. 9A and FIG. 9B; and may be specifically corresponding to related descriptions in FIG. 4, FIG. 6, FIG. 8, and FIG. 9A and FIG. 9B. Details are not described herein again.

In a possible implementation, the processor 12 detects, when the electronic device 1 is in a locked state, an operation performed on the fingerprint sensor in. The processor 12 determines a result of matching a fingerprint collected by the fingerprint sensor in with a preset fingerprint, where the matching result is matching or not matching; and transmits an infrared ray by using an infrared sensor. When a reflected infrared ray is not received, the processor 12 skips executing a response corresponding to the matching result; or when a reflected infrared ray is received, the processor 12 executes a response corresponding to the matching result.

It can be understood that in this implementation, functions of all function modules of the electronic device 1 may be specifically implemented according to the methods in the method embodiments shown in FIG. 5, and FIG. 7 to FIG. 9A and FIG. 9B; and may be specifically corresponding to related descriptions in FIG. 5, and FIG. 7 to FIG. 9A and FIG. 9B. Details are not described herein again.

In this part, several nouns in the embodiments of the present invention are explained and illustrated.

The electronic device is in a locked state, that is, the screen of the electronic device is locked. When a user needs to use the electronic device, the user may perform an operation on the fingerprint sensor to enter a fingerprint, so that the electronic device obtains the matching result by means of fingerprint recognition. When the matching result is matching, the electronic device exits the locked state; or when the matching result is not matching, the electronic device outputs the prompt information.

The prompt information may be used to indicate that the fingerprint collected by the fingerprint sensor does not match the preset fingerprint. For example, when the prompt information indicates that the fingerprint collected by the fingerprint sensor does not match the preset fingerprint, the electronic device may output the prompt information in a vibration manner, a screen-on manner, a resounding manner, or a text information display manner.

Figure 2A:
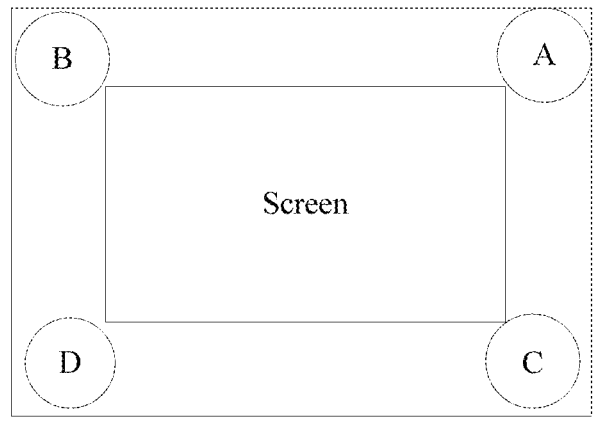
FIG. 2a is a schematic interface diagram of an electronic device having a fingerprint sensor according to an embodiment of the present invention.

The electronic device may include one or more fingerprint sensors. A schematic interface diagram of an electronic device having a fingerprint sensor shown in FIG. 2*a* is used as an example. A fingerprint sensor A is integrated into an upper right corner of the screen of the electronic device; a fingerprint sensor B is integrated into an upper left corner of the screen of the electronic device; a fingerprint sensor C is integrated into a lower right corner of the screen of the electronic device; and a fingerprint sensor D is integrated into a lower left corner of the screen of the electronic device. It should be noted that the fingerprint sensor may be integrated into a rear face, the screen, a side face, or the like of the electronic device. This is not specifically limited in this embodiment of the present invention.

The preset duration may be a preset time period, for example, 10 seconds or 15 seconds. The preset quantity value may be a preset numerical value, such as 3 or 5. For example, the included angle between the direction of the screen and the gravity direction falls beyond the preset range due to an improper operation of the user, and the electronic device skips executing the response corresponding to the matching result. However, if a quantity of operations detected by the electronic device in a 10-second time period and performed on the fingerprint sensor exceeds 5, it indicates that the user repeatedly operates the fingerprint sensor, and the user expects the response corresponding to the matching result to be executed. In this case, the electronic device may execute the response corresponding to the matching result.

Figure 3:
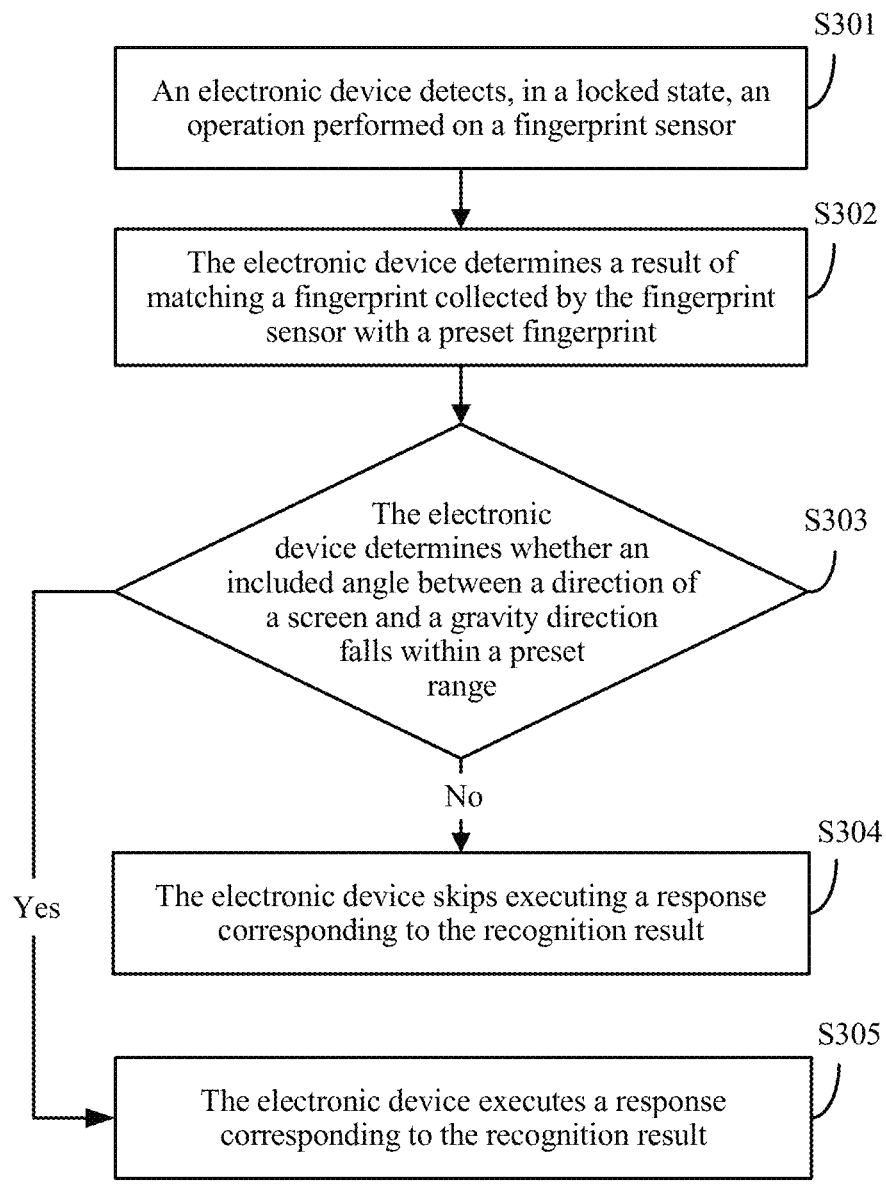
FIG. 3 is a schematic flowchart of a processing method according to an embodiment of the present invention.

Referring to FIG. 3, FIG. 3 is a schematic flowchart of a processing method according to an embodiment of the present invention. The processing method provided in this embodiment of the present invention is applied to an electronic device having a fingerprint sensor and a screen. As shown in FIG. 3, the method may include the following steps.

Step S301: The electronic device detects, in a locked state, an operation performed on the fingerprint sensor.

Figure 2B:
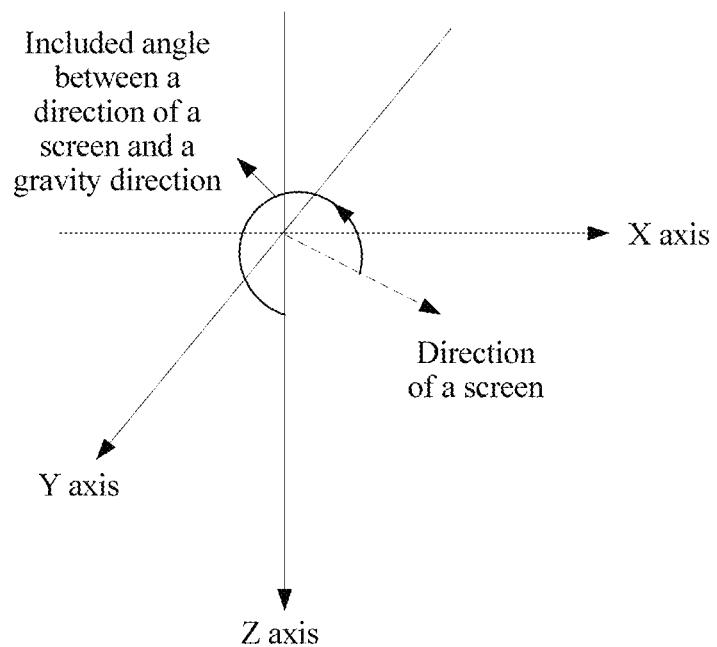
FIG. 2b is a schematic interface diagram of an included angle between a direction of a screen and a gravity direction according to an embodiment of the present invention.
Figure 2C:
FIG. 2C is a schematic interface diagram of an electronic device according to an embodiment of the present invention.
Figure 2D:
FIG. 2d is a schematic interface diagram of an electronic device according to another embodiment of the present invention.
Figure 2E:
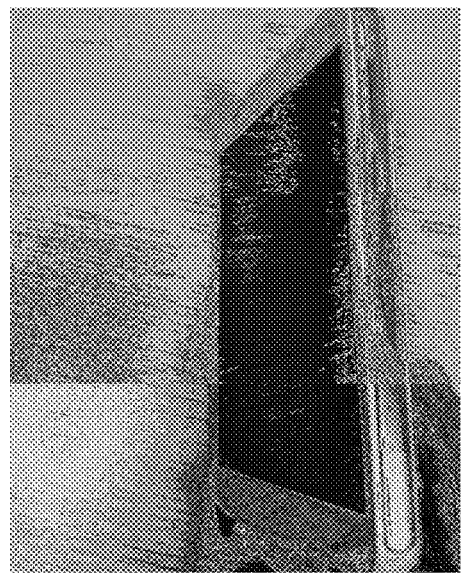
FIG. 2e is a schematic interface diagram of an electronic device according to another embodiment of the present invention.
Figure 2F:
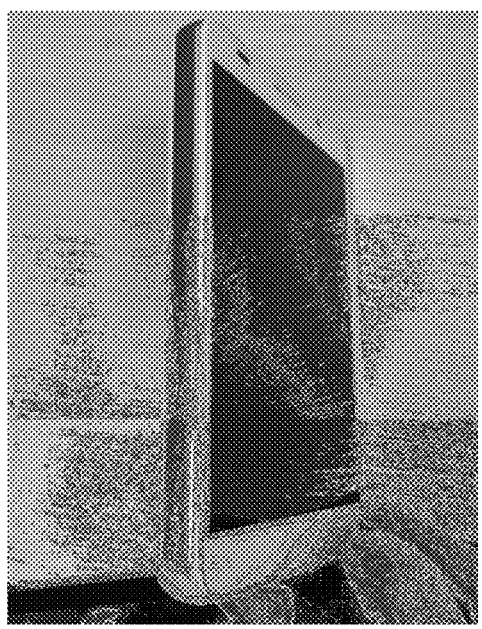
FIG. 2f is a schematic interface diagram of an electronic device according to another embodiment of the present invention.
Figure 2G:
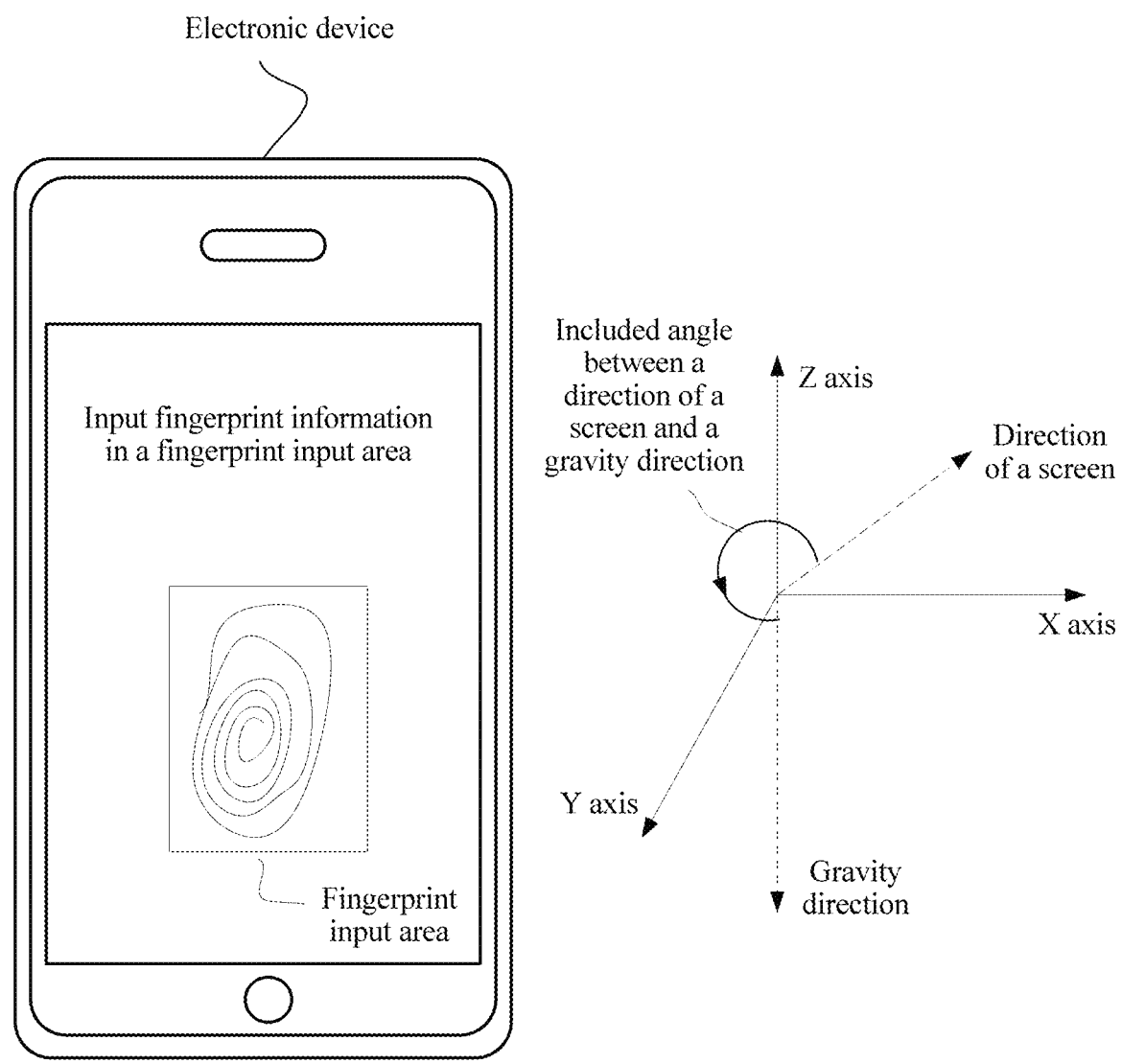
FIG. 2g is a schematic interface diagram of an electronic device according to another embodiment of the present invention.

The electronic device may detect, in a locked state, whether a user performs an operation on the fingerprint sensor. When detecting the operation performed by the user on the fingerprint sensor, the electronic device may collect a fingerprint by using the fingerprint sensor. A schematic interface diagram of an electronic device shown in FIG. 2g is used as an example. When the electronic device is in a locked state, the user may enter a fingerprint in a fingerprint input area shown in FIG. 2g, and the electronic device may detect the operation performed on the fingerprint sensor.

Step S302: The electronic device determines a result of matching a fingerprint collected by the fingerprint sensor with a preset fingerprint.

The electronic device may determine the result of matching the fingerprint collected by the fingerprint sensor with the preset fingerprint. When the collected fingerprint matches the preset fingerprint, the matching result is matching; or when the collected fingerprint does not match the preset fingerprint, the matching result is not matching. Specifically, the electronic device may obtain, by means of fingerprint recognition, the result of matching the fingerprint collected by the fingerprint sensor with the preset fingerprint. A fingerprint recognition technology may include a method for comparing different fingerprint images by means of statistics collection and a method for comparing fingerprint image characteristic information. The method for comparing different fingerprint images by means of statistics collection may specifically include: comparing two fingerprint images by means of statistics collection; obtaining a similarity between the two fingerprint images; and determining, according to the similarity, whether the fingerprint collected by the fingerprint sensor matches the preset fingerprint. The method for comparing fingerprint image characteristic information may specifically include: obtaining, according to structure characteristics of two fingerprint images, characteristic information of the fingerprint images; and comparing the characteristic information of the fingerprint images, so as to determine whether the fingerprint collected by the fingerprint sensor matches the preset fingerprint.

Step S303: The electronic device determines whether an included angle between a direction of the screen and a gravity direction falls within a preset range.

After detecting the operation performed on the fingerprint sensor, the electronic device may determine whether the included angle between the direction of the screen and the gravity direction falls within the preset range. When the included angle between the direction of the screen and the gravity direction falls beyond the preset range, step S304 is further performed; or when the included angle between the direction of the screen and the gravity direction falls within the preset range, step S305 is further performed. It should be understood that in this specification, the included angle between the direction of the screen and the gravity direction may be defined by setting a turning angle at which the direction of the screen turns to the gravity direction counterclockwise (or clockwise) (or the included angle between the direction of the screen and the gravity direction may be defined in another manner, and this is not intended to limit the present invention). The preset range of the included angle between the direction of the screen and the gravity direction may be set to be not less than 90 degrees and not greater than 180 degrees; or may be set to be not less than 0 degree and not greater than 180 degrees; or may be set to be not less than 0 degree and not greater than 360 degrees; or may be set as another angle range. The schematic interface diagram shown in FIG. 2g is used as an example. The electronic device may determine that the gravity direction is the same as a Z-axis direction; further obtain the direction of the screen of the electronic device; and obtain the included angle between the direction of the screen and the gravity direction according to the gravity direction and the direction of the screen. When the included angle between the direction of the screen and the gravity direction falls beyond the preset range, the electronic device skips executing a response corresponding to the matching result; or when the included angle between the direction of the screen and the gravity direction falls within the preset range, the electronic device executes a response corresponding to the matching result.

It should be noted that step S302 and step S303 may be simultaneously performed; or step S302 may be performed before step S303; or step S303 is performed before step S302. There is no strict execution sequence before the two steps. This is not intended to limit the present invention.

In an optional embodiment, multiple preset ranges may be set. For example, the preset range may include a first preset range, a second preset range, a third preset range, and a fourth preset range. When the included angle between the direction of the screen and the gravity direction falls beyond the first preset range, the second preset range, the third preset range, and the fourth preset range, it is determined that the included angle between the direction of the screen and the gravity direction falls beyond the preset range. When the included angle between the direction of the screen and the gravity direction falls within any one of the first preset range, the second preset range, the third preset range, or the fourth preset range, it is determined that the included angle between the direction of the screen and the gravity direction falls within the preset range. For example, the first preset range may be [0°, 30°] and [330°, 360°], the second preset range may be [60°, 120°], the third preset range may be [150°, 210°], and the fourth preset range may be [240°, 310°]. When the included angle between the direction of the screen and the gravity direction falls within [0°, 30°], [330°, 360°], [60°, 120°], [150°, 210°], or [240°, 310°], it is determined that the included angle between the direction of the screen and the gravity direction falls within the preset range; or when the included angle between the direction of the screen and the gravity direction falls beyond [0°, 30°], [330°, 360°], [60°, 120°], [150°, 210°], and [240°, 310°], it is determined that the included angle between the direction of the screen and the gravity direction falls beyond the preset range. It should be understood that the electronic device may further update the preset range correspondingly according to a status of the electronic device. For example, when it is detected that the electronic device is in a motion state (for example, a user holding the electronic device is walking, running, or riding), the electronic device uses a first preset range [90+, 180°]; or when it is detected that the electronic device is in a stationary state, the electronic device uses a second preset range [0°, 270+]. The status of the electronic device may be classified in another manner, and a corresponding preset range may be set. This is not intended to limit the present invention.

Optionally, the electronic device may further update the preset range correspondingly according to a posture (for example, a walking, running, standing, sitting, side-lying, prone, or supine posture) of a user holding the electronic device. For example, when the electronic device detects that the user holding the electronic device is in a walking, running, standing, or sitting posture, the electronic device uses a first preset range [90°, 180°]; when the electronic device detects that the user holding the electronic device is in a prone posture, the electronic device uses a second preset range [180°−deviation value, 180°+deviation value]; when the electronic device detects that the user holding the electronic device is in a supine posture, the electronic device uses a third preset range [0°−deviation value, 0°+deviation value] and/or [360°−deviation value, 360°+deviation value];

or when the electronic device detects that the user holding the electronic device is in a side-lying posture, the electronic device uses a fourth preset range [90°−deviation value, 90°+deviation value] and/or [270°−deviation value, 270°+deviation value]. The posture of the user holding the electronic device may be classified in another manner, a corresponding preset range may be set, and a deviation value may be 15° or 30°, or may be another value. This is not intended to limit the present invention. Preset ranges may be different, or may be partially the same, or may be totally different. This is not specifically limited in this embodiment of the present invention.

In an optional embodiment, after detecting the operation performed on the fingerprint sensor, the electronic device may determine the included angle between the direction of the screen and the gravity direction by using data collected by at least one of a geomagnetic sensor, an angular velocity sensor, or an acceleration sensor. Specifically, the electronic device may obtain gravity distribution and geomagnetic data of the electronic device on an X axis, a Y axis, and a Z axis by using the geomagnetic sensor, and obtain the direction of the screen according to the gravity distribution and the geomagnetic data. The electronic device may obtain angular velocities of the electronic device on an X axis, a Y axis, and a Z axis by using the angular velocity sensor; integrate the angular velocities in terms of time; obtain an angle between the electronic device and the X axis, an angle between the electronic device and the Y axis, and an angle between the electronic device and the Z axis; and then obtain the direction of the screen according to the foregoing angles. The electronic device may obtain an acceleration x of the electronic device on an X axis, an acceleration y of the electronic device on a Y axis, and an acceleration z of the electronic device on a Z axis by using the acceleration sensor; obtain an angle between the electronic device and the Z axis by using a formula $\arctan(\sqrt{x^2+y^2}/z)$; obtain an angle between the electronic device and the X axis by using a formula $\arctan(\sqrt{z^2+y^2}/x)$; obtain an angle between the electronic device and the Y axis by using a formula $\arctan(\sqrt{x^2+z^2}/y)$; in the direction of the screen according to the foregoing angles. Further, the gravity direction is a positive direction of the Z axis. The electronic device may obtain the included angle between the direction of the screen and the gravity direction according to the direction of the screen, and may define the included angle between the direction of the screen and the gravity direction by setting a turning angle at which the direction of the screen turns to the gravity direction counterclockwise (or clockwise). FIG. 2b and FIG. 2g in this specifications show that the turning angle at which the direction of the screen turns to the gravity direction counterclockwise is used as the included angle between the direction of the screen and the gravity direction In an optional embodiment, when the included angle between the direction of the screen and the gravity direction falls beyond the preset range, the electronic device may obtain acceleration values of the electronic device on an X axis, a Y axis, and a Z axis by using an acceleration sensor; and when each of the three obtained acceleration values is less than a corresponding preset acceleration threshold, skip executing the response corresponding to the matching result; or when any of the three obtained acceleration values is not less than a corresponding preset acceleration threshold, execute the response corresponding to the matching result. For example, when the electronic device detects the operation performed on the fingerprint sensor, and the included angle between the direction of the screen and the gravity direction falls beyond the preset range, the electronic device may obtain the acceleration values of the electronic device on the X axis, the Y axis, and the Z axis by using the acceleration sensor. When each of the three obtained acceleration values is less than the corresponding preset acceleration threshold, it indicates that the user does not perform an operation of picking up the electronic device, it is determined that the fingerprint sensor is accidentally touched, and the electronic device skips executing the response corresponding to the matching result. Alternatively, when any of the three obtained acceleration values is not less than the corresponding preset acceleration threshold, it indicates that the user operates the fingerprint sensor in a process of picking up the electronic device, and the electronic device executes the response corresponding to the matching result. Further, optionally, when the included angle between the direction of the screen and the gravity direction falls beyond the preset range, the electronic device may obtain acceleration values of the electronic device on an X axis, a Y axis, and a Z axis in preset duration by using an acceleration sensor; and when each of the three obtained acceleration values is less than a corresponding preset acceleration threshold, skip executing the response corresponding to the matching result; or when any of the three obtained acceleration values is not less than a corresponding preset acceleration threshold, execute the response corresponding to the matching result. The preset duration may be determined according to frequency of collecting data by the acceleration sensor. For example, if the acceleration sensor collects data at an interval of 10 s, the electronic device may set the preset duration to 10 s. The electronic device may obtain data collected by the acceleration sensor for the first time after detecting that the included angle between the direction of the screen and the gravity direction falls beyond the preset range, and obtain the acceleration values of the electronic device on the X axis, the Y axis, and the Z axis according to the collected data. Optionally, the preset duration may be preset by the user, for example, 30 s. In this case, the electronic device obtains data collected by the acceleration sensor in a time period of 30 s after detecting that the included angle between the direction of the screen and the gravity direction falls beyond the preset range, and obtains the acceleration values of the electronic device on the X axis, the Y axis, and the Z axis according to the collected data.

Step S304: The electronic device skips executing a response corresponding to the matching result.

When the included angle between the direction of the screen and the gravity direction falls beyond the preset range, the electronic device may skip executing the response corresponding to the matching result. For example, when the matching result is matching, the electronic device may not exit the locked state; or when the matching result is not matching, the electronic device may not output prompt information.

In an optional embodiment, after the electronic device skips executing the response corresponding to the matching result, when a quantity of operations detected in preset duration and performed on the fingerprint sensor exceeds a preset quantity value, the electronic device may determine a matching result of the operation detected in the preset duration; and when the matching result is matching, execute a response corresponding to the matching. In specific implementation, the included angle between the direction of the screen and the gravity direction may fall beyond the preset range or an input fingerprint is not complete because of an improper operation of the user. If the user repeatedly operates the fingerprint sensor in the preset duration, and the quantity of operations performed on the fingerprint sensor exceeds the preset quantity value, it indicates that the user expects the response corresponding to the matching result to be executed. If it is determined that at least one of matching results of the operations detected in the preset duration is matching, the electronic device may execute the response corresponding to the matching, for example, exit the locked state, so that processing efficiency and user experience of the electronic device are improved.

In an optional embodiment, when a quantity of operations detected in preset duration and performed on the fingerprint sensor exceeds a preset quantity value, a matching result of a last operation detected in the preset duration is determined, and a response corresponding to the matching result of the last operation is executed. In specific implementation, the included angle between the direction of the screen and the gravity direction may fall beyond the preset range or an input fingerprint is not complete because of an improper operation of the user. If the user repeatedly operates the fingerprint sensor in the preset duration, and the quantity of operations performed on the fingerprint sensor exceeds the preset quantity value, it indicates that the user expects the response corresponding to the matching result to be executed. The electronic device may determine the matching result of the last operation detected in the preset duration, and execute the response corresponding to the matching result of the last operation. For example, when the matching result of the last operation is matching, the electronic device exits the locked state; or when the matching result of the last operation is not matching, the electronic device outputs the prompt information, so that processing efficiency and user experience of the electronic device are improved.

Step S305: The electronic device executes a response corresponding to the matching result.

When the included angle between the direction of the screen and the gravity direction falls within the preset range, the electronic device may execute the response corresponding to the matching result. A schematic interface diagram of an electronic device shown in FIG. 2j is used as an example. When the matching result is matching, the electronic device may exit the locked state; or when the matching result is not matching, the electronic device may output prompt information. The prompt information is used to indicate that the fingerprint collected by the fingerprint sensor does not match the preset fingerprint. It should be understood that the prompt information may be text display, vibration, or making a preset sound.

In this embodiment shown in FIG. 3, the electronic device detects, in a locked state, the operation performed on the fingerprint sensor; determines the result of matching the fingerprint collected by the fingerprint sensor with the preset fingerprint; and when the included angle between the direction of the screen and the gravity direction falls beyond the preset range, skips executing the response corresponding to the matching result; or when the included angle between the direction of the screen and the gravity direction falls within the preset range, executes the response corresponding to the matching result. Therefore, a response caused due to accidental touch of the fingerprint sensor can be avoided, and resource utilization can be improved.

Figure 4:
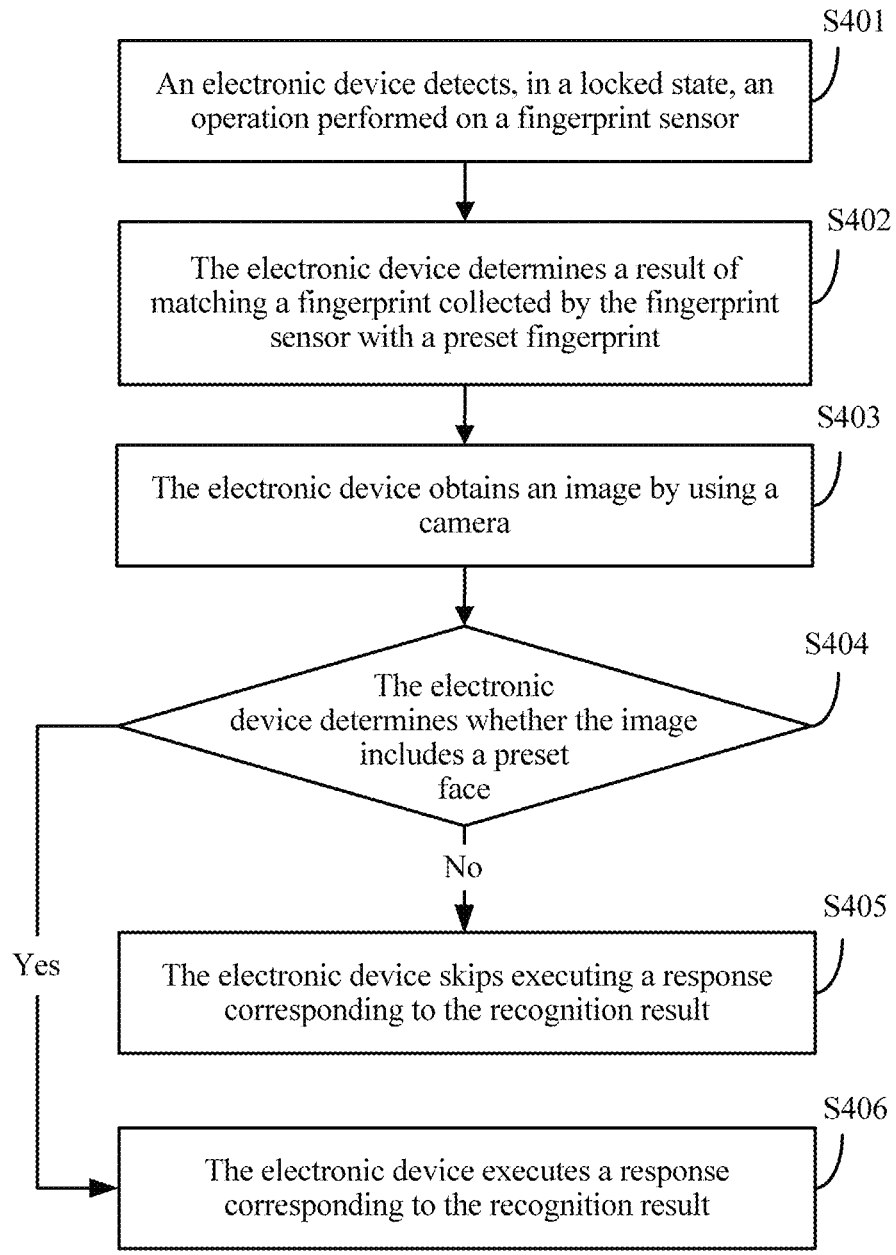
FIG. 4 is a schematic flowchart of a processing method according to another embodiment of the present invention.

Referring to FIG. 4, FIG. 4 is a schematic flowchart of a processing method according to another embodiment of the present invention. The processing method provided in this embodiment of the present invention is applied to an electronic device having a fingerprint sensor, a camera, and a screen. As shown in FIG. 4, the method may include the following steps.

Step S401: The electronic device detects, in a locked state, an operation performed on the fingerprint sensor.

Figure 2H:
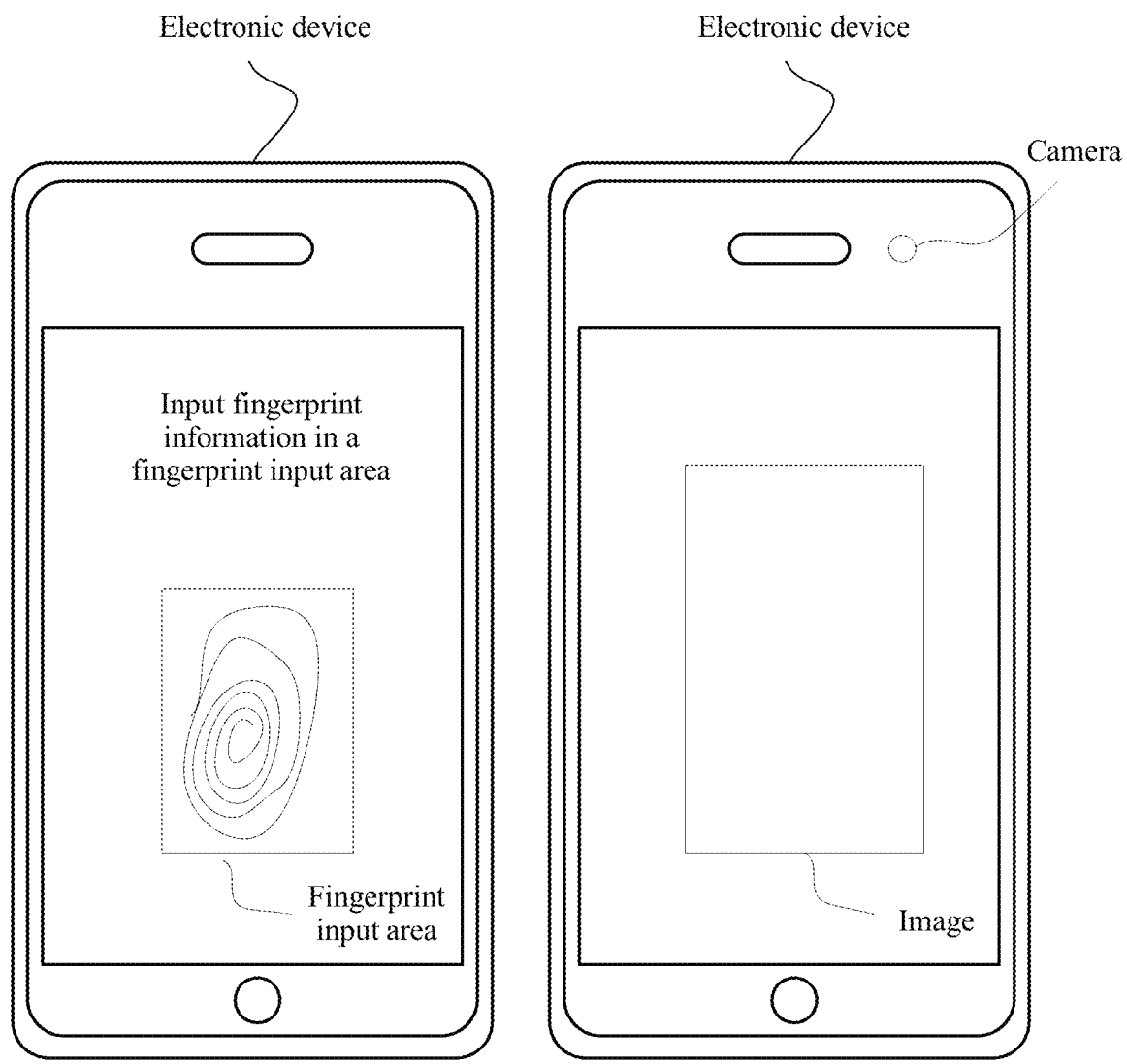
FIG. 2h is a schematic interface diagram of an electronic device according to another embodiment of the present invention.

A schematic interface diagram of an electronic device shown in FIG. 2h is used as an example. When the electronic device is in a locked state, a user may enter a fingerprint in a fingerprint input area shown in FIG. 2h, and the electronic device may detect the operation performed on the fingerprint sensor.

Step S402: The electronic device determines a result of matching a fingerprint collected by the fingerprint sensor with a preset fingerprint.

Step S403: The electronic device obtains an image by using the camera.

After detecting the operation performed on the fingerprint sensor, the electronic device may obtain the image by using the camera. In specific implementation, after detecting the operation performed on the fingerprint sensor, the electronic device may trigger a front-facing camera, and obtain the image by using the front-facing camera. The schematic diagram of the interface shown in FIG. 2h is used as an example. The electronic device may obtain the image by using the camera; and when the image includes a preset face, execute a response corresponding to the matching result; or when the image does not include a face or the image does not include a preset face, skip executing a response corresponding to the matching result.

Step S404: The electronic device determines whether the image includes a preset face.

The electronic device may perform facial recognition on the obtained image, and when the image includes the face, determine whether the image includes the preset face. When the image includes the preset face, it indicates that an owner of the electronic device is using the electronic device, and the response corresponding to the matching result may be executed. When the image does not include the face or the image does not include the preset face, it indicates that an owner of the electronic device does not use the electronic device currently, and the response corresponding to the matching result may not be executed.

Step S405: The electronic device skips executing a response corresponding to the matching result.

When the image obtained by the camera does not include the preset face, the electronic device may skip executing the response corresponding to the matching result.

In an optional embodiment, when the image does not include the preset face, the electronic device may obtain acceleration values of the electronic device on an X axis, a Y axis, and a Z axis by using an acceleration sensor; and when each of the three obtained acceleration values is less than a corresponding preset acceleration threshold, skip executing the response corresponding to the matching result; or when any of the three obtained acceleration values is not less than a corresponding preset acceleration threshold, execute the response corresponding to the matching result.

In an optional embodiment, after the electronic device skips executing the response corresponding to the matching result, when a quantity of operations detected in preset duration and performed on the fingerprint sensor exceeds a preset quantity value, the electronic device may determine a matching result of the operation detected in the preset duration; and when the matching result is matching, execute a response corresponding to the matching.

In an optional embodiment, when a quantity of operations detected in preset duration and performed on the fingerprint sensor exceeds a preset quantity value, the electronic device may determine a matching result of a last operation detected in the preset duration, and execute a response corresponding to the matching result of the last operation.

Step S406: The electronic device executes a response corresponding to the matching result.

When the image obtained by the camera includes the preset face, the electronic device may execute the response corresponding to the matching result. A schematic interface diagram of an electronic device shown in FIG. 2j is used as an example. When the matching result is matching, the electronic device may exit the locked state; or when the matching result is not matching, the electronic device may output prompt information. The prompt information is used to indicate that the fingerprint collected by the fingerprint sensor does not match the preset fingerprint. It should be understood that the prompt information may be text display, vibration, or making a preset sound.

In this embodiment shown in FIG. 4, the electronic device detects, in a locked state, the operation performed on the fingerprint sensor; determines the result of matching the fingerprint collected by the fingerprint sensor with the preset fingerprint; obtains the image by using the camera; and when the image includes the preset face, executes the response corresponding to the matching result; or when the image does not include the preset face, skips executing the response corresponding to the matching result. Therefore, a response caused due to accidental touch of the fingerprint sensor can be prevented from being executed.

Figure 5:
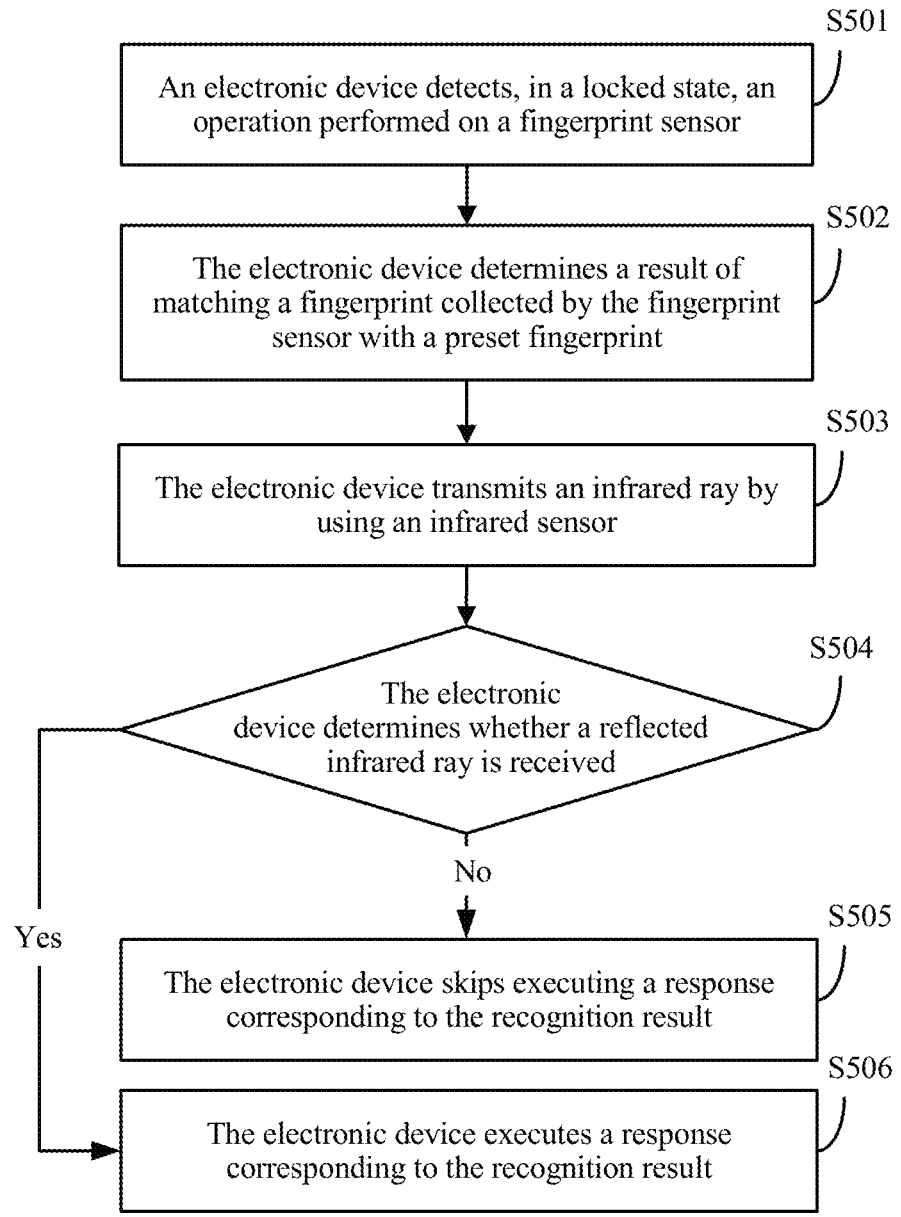
FIG. 5 is a schematic flowchart of a processing method according to another embodiment of the present invention.

Referring to FIG. 5, FIG. 5 is a schematic flowchart of a processing method according to another embodiment of the present invention. The processing method provided in this embodiment of the present invention is applied to an electronic device having a fingerprint sensor, an infrared sensor, and a screen. As shown in FIG. 5, the method may include the following steps.

Step S501: The electronic device detects, in a locked state, an operation performed on the fingerprint sensor.

Figure 2I:
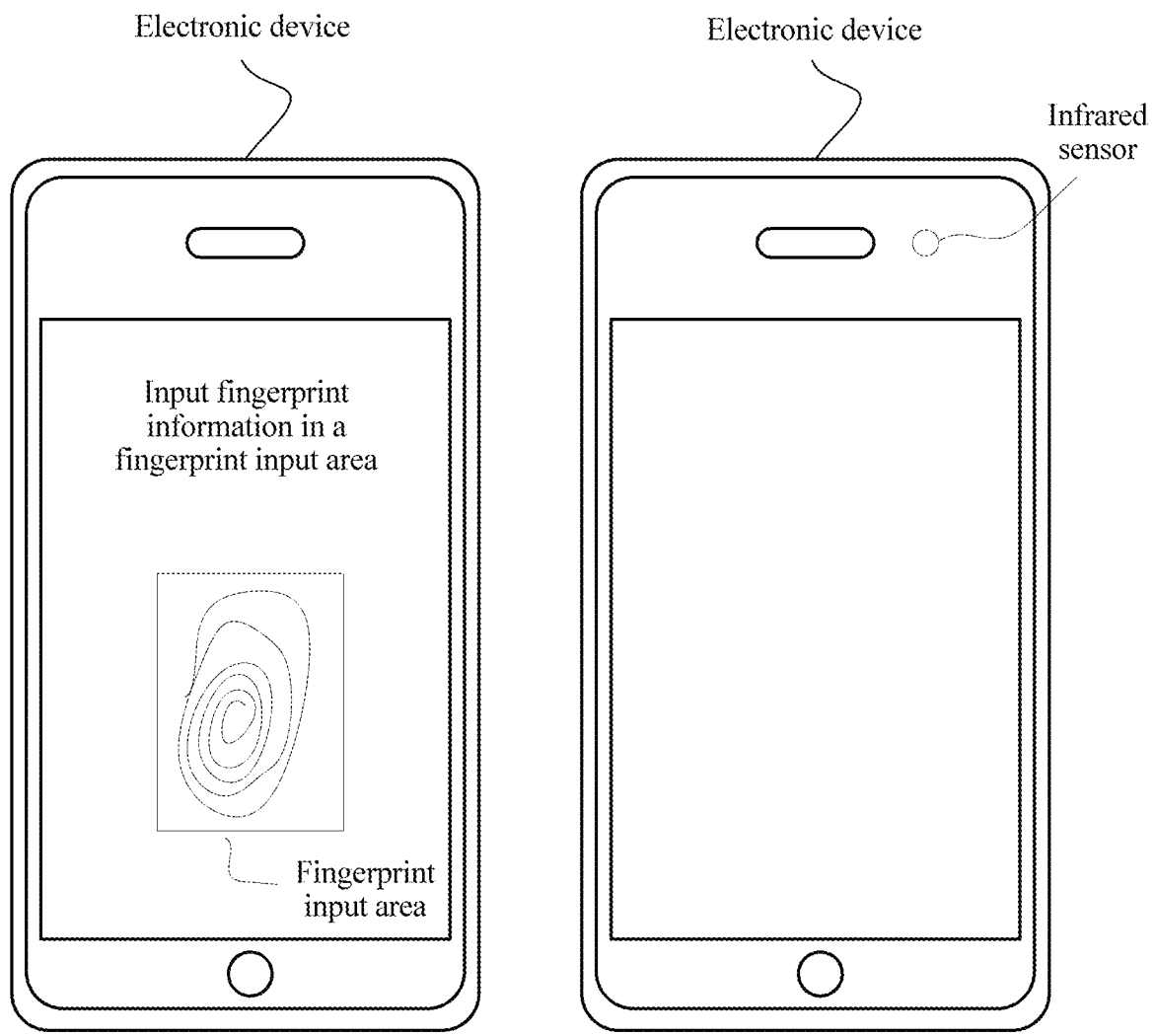
FIG. 2i is a schematic interface diagram of an electronic device according to another embodiment of the present invention.
Figure 2J:
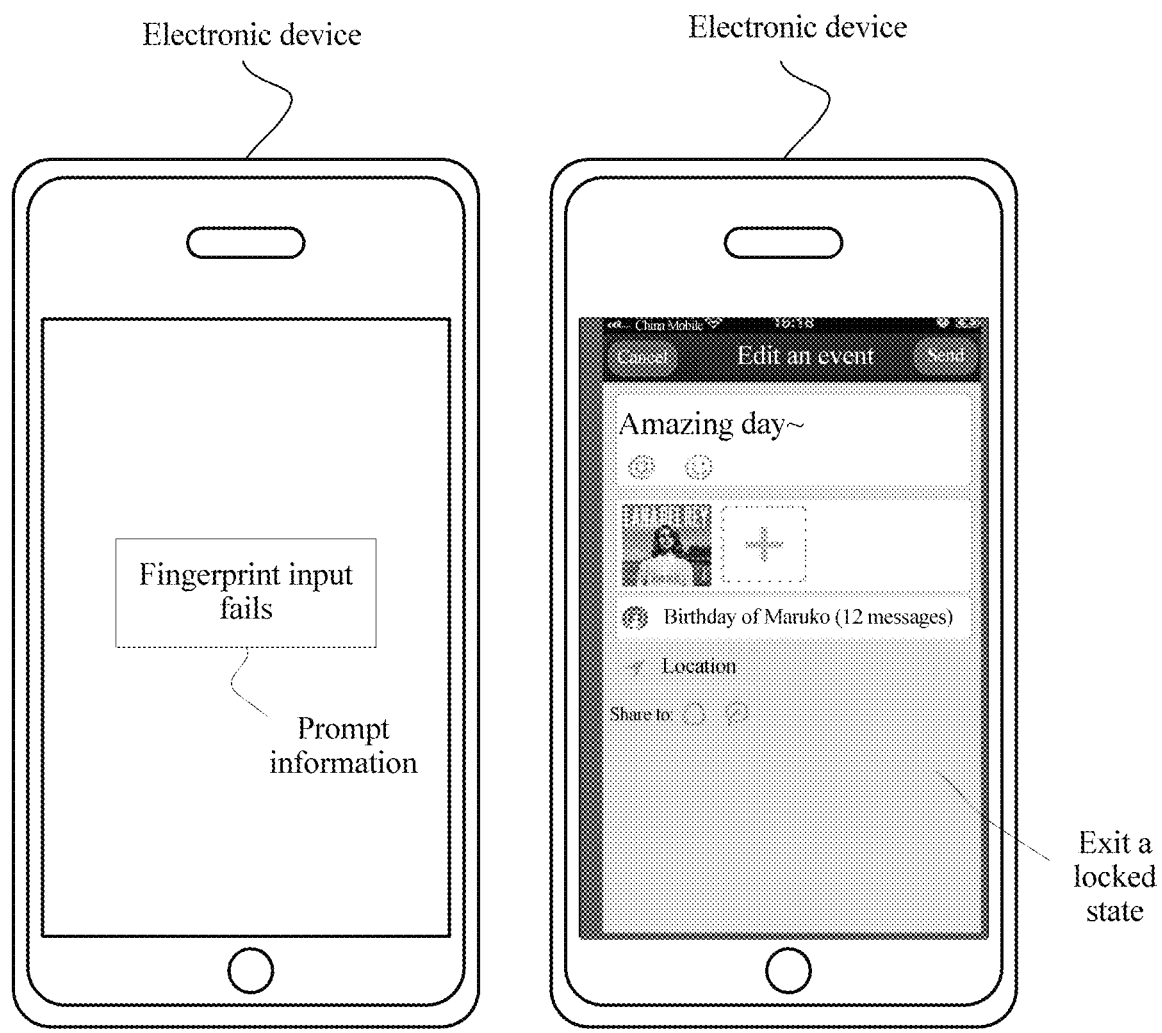
FIG. 2j is a schematic interface diagram of an electronic device according to another embodiment of the present invention.
Figure 2K:
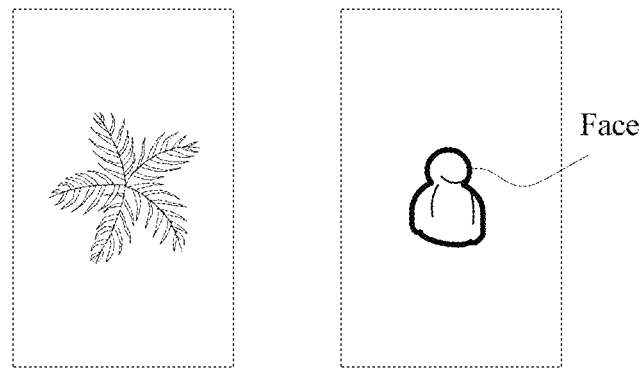
FIG. 2k is a schematic interface diagram of an electronic device according to another embodiment of the present invention.

A schematic interface diagram of an electronic device shown in FIG. 2i is used as an example. When the electronic device is in a locked state, a user may enter a fingerprint in a fingerprint input area shown in FIG. 2i, and the electronic device may detect the operation performed on the fingerprint sensor.

Step S502: The electronic device determines a result of matching a fingerprint collected by the fingerprint sensor with a preset fingerprint.

Step S503: The electronic device transmits an infrared ray by using the infrared sensor.

After detecting the operation performed on the fingerprint sensor, the electronic device may transmit the infrared ray by using the infrared sensor. In specific implementation, the infrared sensor may be integrated above the screen of the electronic device. After detecting the operation performed on the fingerprint sensor, the electronic device may trigger the infrared sensor to transmit the infrared ray.

Step S504: The electronic device determines whether a reflected infrared ray is received. The schematic interface diagram shown in FIG. 2i is used as an example. The electronic device may transmit the infrared ray by using the infrared sensor; and when the reflected infrared ray is not received, skip executing a response corresponding to the matching result; or when the reflected infrared ray is received, execute a response corresponding to the matching result.

After transmitting the infrared ray by using the infrared sensor, the electronic device may determine whether the reflected infrared ray is received in preset duration. When the reflected infrared ray is not received, it indicates that the user does not use the electronic device currently, and the response corresponding to the matching result is not executed; or when the reflected infrared ray is received, it indicates that the user is using the electronic device currently, and the response corresponding to the matching result is executed.

In specific implementation, if the user is using the electronic device currently, the user is in an infrared transmission area, and the transmitted infrared ray is reflected to the infrared sensor due to blockage of the user, the electronic device may receive the reflected infrared ray. If the user does not use the electronic device currently, the user is in an area other than an infrared transmission area, and the transmitted infrared ray is not blocked and not reflected to the infrared sensor, the electronic device cannot receive the reflected infrared ray.

Step S505: The electronic device skips executing a response corresponding to the matching result.

When the electronic device does not receive the reflected infrared ray, the electronic device may skip executing the response corresponding to the matching result.

In an optional embodiment, when the reflected infrared ray is not received, the electronic device may obtain acceleration values of the electronic device on an X axis, a Y axis, and a Z axis by using an acceleration sensor; and when each of the three obtained acceleration values is less than a corresponding preset acceleration threshold, skip executing the response corresponding to the matching result; or when any of the three obtained acceleration values is not less than a corresponding preset acceleration threshold, execute the response corresponding to the matching result.

In an optional embodiment, after the electronic device skips executing the response corresponding to the matching result, when a quantity of operations detected in preset duration and performed on the fingerprint sensor exceeds a preset quantity value, the electronic device may determine a matching result of the operation detected in the preset duration; and when the matching result is matching, execute a response corresponding to the matching.

In an optional embodiment, when a quantity of operations detected in preset duration and performed on the fingerprint sensor exceeds a preset quantity value, the electronic device may determine a matching result of a last operation detected in the preset duration, and execute a response corresponding to the matching result of the last operation.

Step S506: The electronic device executes a response corresponding to the matching result.

When receiving the reflected infrared ray, the electronic device may execute the response corresponding to the matching result. A schematic interface diagram of an electronic device shown in FIG. 2j is used as an example. When the matching result is matching, the electronic device may exit the locked state; or when the matching result is not matching, the electronic device may output prompt information. The prompt information is used to indicate that the fingerprint collected by the fingerprint sensor does not match the preset fingerprint. It should be understood that the prompt information may be text display, vibration, or making a preset sound.

In this embodiment shown in FIG. 5, the electronic device detects, in a locked state, the operation performed on the fingerprint sensor; determines the result of matching the fingerprint collected by the fingerprint sensor with the preset fingerprint; transmits the infrared ray by using the infrared sensor; determines whether the reflected infrared ray is received; and when the reflected infrared ray is received, executes the response corresponding to the matching result; or when the reflected infrared ray is not received, skips executing the response corresponding to the matching result. Therefore, a response caused due to accidental touch of the fingerprint sensor can be prevented from being executed.

Figure 6:
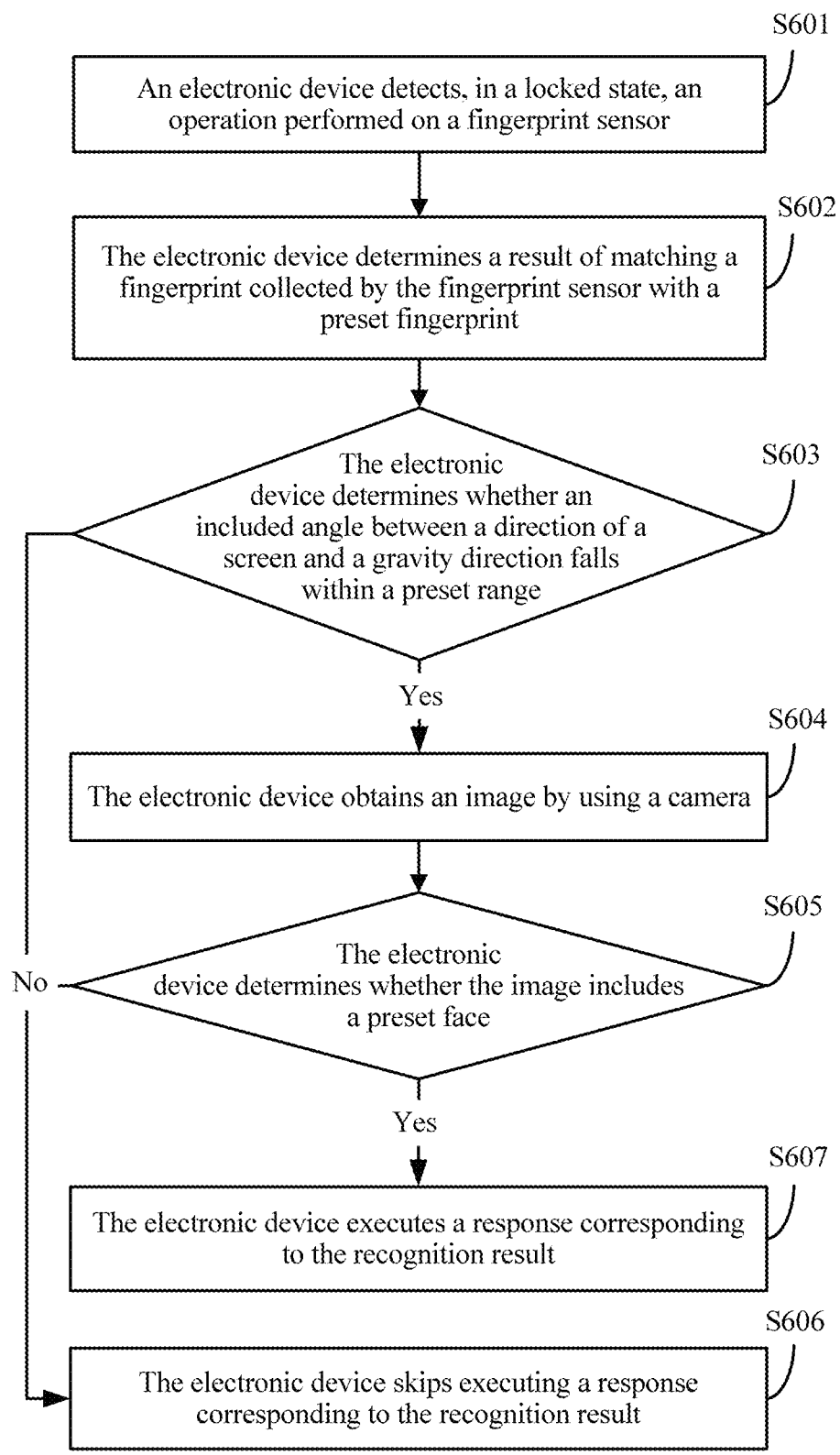
FIG. 6 is a schematic flowchart of a processing method according to another embodiment of the present invention.

Referring to FIG. 6, FIG. 6 is a schematic flowchart of a processing method according to another embodiment of the present invention. The processing method provided in this embodiment of the present invention is applied to an electronic device having a fingerprint sensor, a camera, and a screen. As shown in FIG. 6, the method may include the following content.

Steps S601 to S603 are the same as steps S301 to S303. For specific details, refer to the foregoing corresponding content. Details are not described herein again.

Steps S604 and S605 are the same as steps S403 and S404. For specific details, refer to the foregoing corresponding content. Details are not described herein again.

It should be noted that step S603 and step S604 may be simultaneously performed; or step S603 may be performed before step S604; or step S604 is performed before step S603. There is no strict execution sequence between the two steps. This is not intended to limit the present invention.

For example, the electronic device may determine whether an included angle between a direction of the screen and a gravity direction falls within a preset range. When the included angle between the direction of the screen and the gravity direction falls beyond the preset range, step S606 is performed; or when the included angle between the direction of the screen and the gravity direction falls within the preset range, the electronic device obtains an image by using the camera, and determines whether the image includes a preset face. When the image includes the preset face, step S607 is performed; or when the image does not include the preset face, step S606 is performed.

For another example, the electronic device may obtain an image by using the camera, and determine whether the image includes a preset face. When the image does not include the preset face, step S606 is performed; or when the image includes the preset face, the electronic device determines whether an included angle between a direction of the screen and a gravity direction falls within a preset range. When the included angle between the direction of the screen and the gravity direction falls beyond the preset range, step S606 is performed; or when the included angle between the direction of the screen and the gravity direction falls within the preset range, step S607 is performed.

For another example, after detecting an operation performed on the fingerprint sensor, the electronic device may obtain an image by using the camera, so as to determine whether the image includes a preset face and determine whether an included angle between a direction of the screen and a gravity direction falls within a preset range. When the image includes the preset face and the included angle between the direction of the screen and the gravity direction falls within the preset range, step S607 is performed; or when the image does not include the preset face or the included angle between the direction of the screen and the gravity direction falls beyond the preset range, step S606 is performed.

Steps S606 and S607 are the same as steps S304 and S305. For specific details, refer to the foregoing corresponding content. Details are not described herein again.

In this embodiment shown in FIG. 6, the electronic device detects, in a locked state, the operation performed on the fingerprint sensor; determines a result of matching a fingerprint collected by the fingerprint sensor with a preset fingerprint; determines whether the included angle between the direction of the screen and the gravity direction falls within the preset range; obtains the image by using the camera; and determines whether the image includes the preset face. When the included angle between the direction of the screen and the gravity direction falls within the preset range and the image includes the preset face, the electronic device executes a response corresponding to the matching result. Otherwise, the electronic device skips executing a response corresponding to the matching result. Therefore, a response caused due to accidental touch of the fingerprint sensor can be prevented from being executed.

Figure 7:
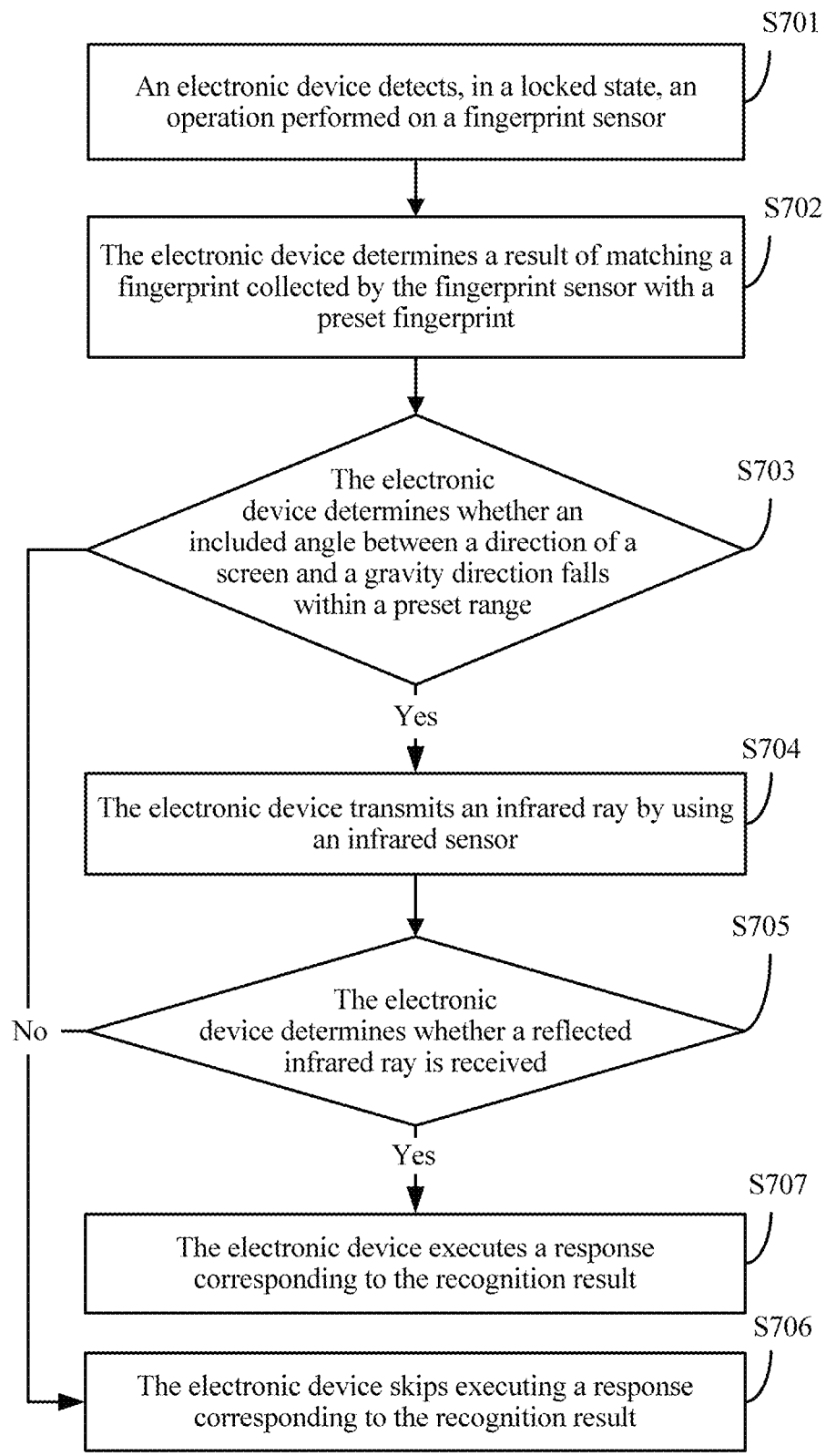
FIG. 7 is a schematic flowchart of a processing method according to another embodiment of the present invention.

Referring to FIG. 7, FIG. 7 is a schematic flowchart of a processing method according to another embodiment of the present invention. The processing method provided in this embodiment of the present invention is applied to an electronic device having a fingerprint sensor, an infrared sensor, and a screen. As shown in FIG. 7, the method may include the following content.

Steps S701 to S703 are the same as steps S301 to S303. For specific details, refer to the foregoing corresponding content. Details are not described herein again.

Steps S704 and S705 are the same as steps S503 and S504. For specific details, refer to the foregoing corresponding content. Details are not described herein again.

It should be noted that step S703 and step S704 may be simultaneously performed; or step S703 may be performed before step S704; or step S704 is performed before step S703. There is no strict execution sequence between the two steps. This is not intended to limit the present invention.

For example, the electronic device may determine whether an included angle between a direction of the screen and a gravity direction falls within a preset range. When the included angle between the direction of the screen and the gravity direction falls beyond the preset range, step S706 is performed; or when the included angle between the direction of the screen and the gravity direction falls within the preset range, the electronic device transmits an infrared ray by using the infrared sensor, and determines whether a reflected infrared ray is received. When the reflected infrared ray is received, step S707 is performed; or when the reflected infrared ray is not received, step S706 is performed.

For another example, the electronic device may transmit an infrared ray by using the infrared sensor, and determine whether a reflected infrared ray is received. When the reflected infrared ray is not received, step S706 is performed; or when the reflected infrared ray is received, the electronic device determines whether an included angle between a direction of the screen and a gravity direction falls within a preset range. When the included angle between the direction of the screen and the gravity direction falls beyond the preset range, step S706 is performed; or when the included angle between the direction of the screen and the gravity direction falls within the preset range, step S707 is performed.

For another example, after detecting an operation performed on the fingerprint sensor, the electronic device may transmit an infrared ray by using the infrared sensor, so as to determine whether a reflected infrared ray is received, and determine whether an included angle between a direction of the screen and a gravity direction falls within a preset range. When the reflected infrared ray is received and the included angle between the direction of the screen and the gravity direction falls within the preset range, step S707 is performed; or when the reflected infrared ray is not received or the included angle between the direction of the screen and the gravity direction falls beyond the preset range, step S706 is performed.

Steps S706 and S707 are the same as steps S304 and S305. For specific details, refer to the foregoing corresponding content. Details are not described herein again.

In this embodiment shown in FIG. 7, the electronic device detects, in a locked state, the operation performed on the fingerprint sensor; determines a result of matching a fingerprint collected by the fingerprint sensor with a preset fingerprint; determines whether the included angle between the direction of the screen and the gravity direction falls within the preset range; transmits the infrared ray by using the infrared sensor; and determines whether the reflected infrared ray is received. When the included angle between the direction of the screen and the gravity direction falls within the preset range and the reflected infrared ray is received, the electronic device executes a response corresponding to the matching result. Otherwise, the electronic device skips executing a response corresponding to the matching result. Therefore, a response caused due to accidental touch of the fingerprint sensor can be prevented from being executed.

Figure 8:
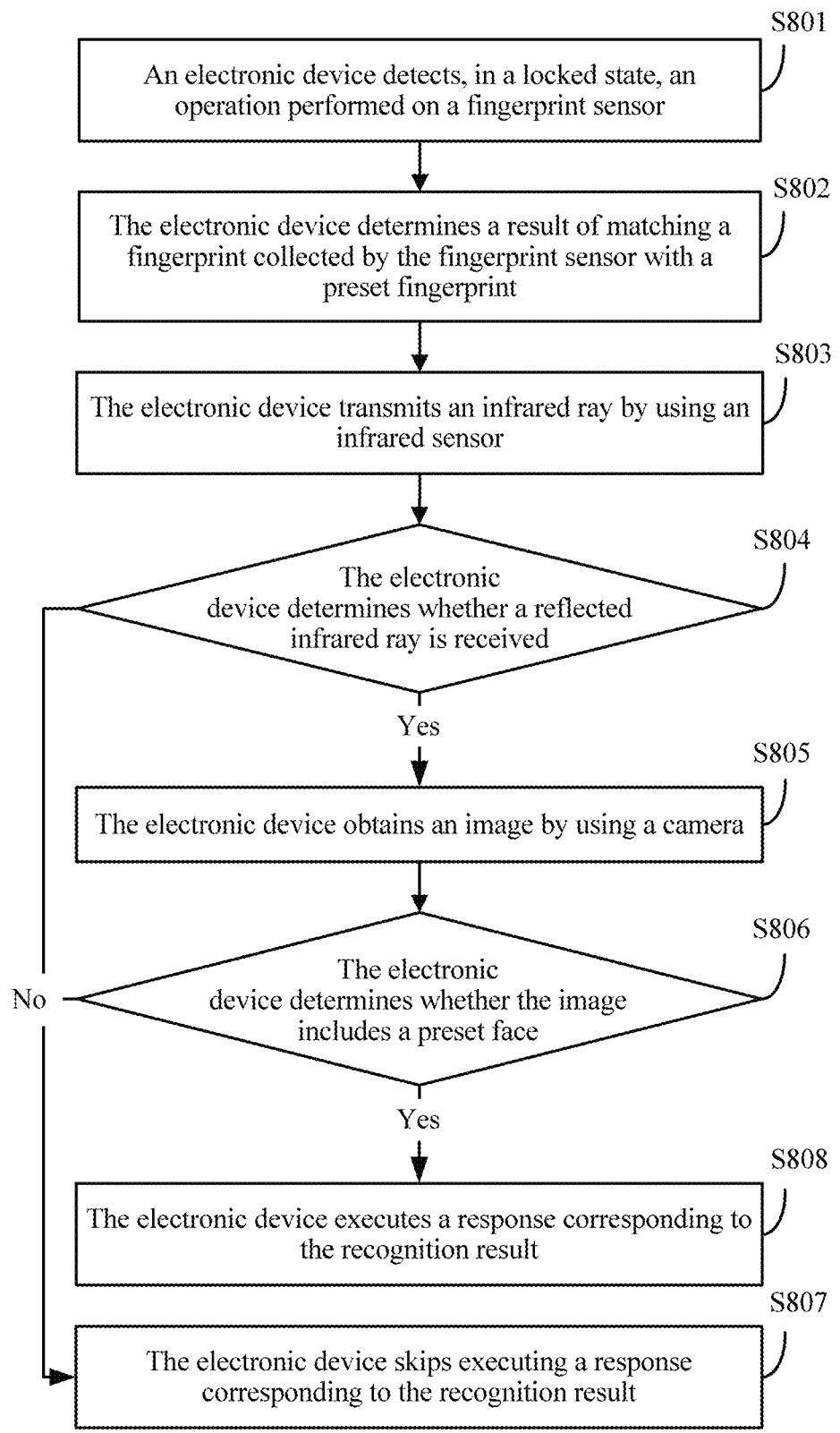
FIG. 8 is a schematic flowchart of a processing method according to another embodiment of the present invention.

Referring to FIG. 8, FIG. 8 is a schematic flowchart of a processing method according to another embodiment of the present invention. The processing method provided in this embodiment of the present invention is applied to an electronic device having a fingerprint sensor, an infrared sensor, a camera, and a screen. As shown in FIG. 8, the method may include the following content.

Steps S801 to S804 are the same as steps S501 to S504. For specific details, refer to the foregoing corresponding content. Details are not described herein again. Steps S805 and S806 are the same as steps S403 and S404. For specific details, refer to the foregoing corresponding content. Details are not described herein again.

It should be noted that step S803 and step S805 may be simultaneously performed; or step S803 may be performed before step S805; or step S805 is performed before step S803. There is no strict execution sequence between the two steps. This is not intended to limit the present invention.

For example, the electronic device may transmit an infrared ray by using the infrared sensor, and determine whether a reflected infrared ray is received. When the reflected infrared ray is not received, step S807 is performed; or when the reflected infrared ray is received, the electronic device obtains an image by using the camera, and determines whether the image includes a preset face. When the image includes the preset face, step S808 is performed; or when the image does not include the preset face, step S807 is performed.

For another example, the electronic device may obtain an image by using the camera, and determine whether the image includes a preset face. When the image does not include the preset face, step S807 is performed; or when the image includes the preset face, the electronic device transmits an infrared ray by using the infrared sensor, and determines whether a reflected infrared ray is received. When the reflected infrared ray is not received, step S807 is performed; or when the reflected infrared ray is received, step S808 is performed.

For another example, after detecting an operation performed on the fingerprint sensor, the electronic device may transmit an infrared ray by using the infrared sensor, and obtain an image by using the camera, so as to determine whether a reflected infrared ray is received, and determine whether the image includes a preset face. When the reflected infrared ray is received and the image includes the preset face, step S808 is performed; or when the reflected infrared ray is not received or the image does not include the preset face, step S807 is performed.

Steps S807 and S808 are the same as steps S304 and S305. For specific details, refer to the foregoing corresponding content. Details are not described herein again.

In this embodiment shown in FIG. 8, the electronic device detects, in a locked state, the operation performed on the fingerprint sensor; determines a result of matching a fingerprint collected by the fingerprint sensor with a preset fingerprint; transmits the infrared ray by using the infrared sensor; obtains the image by using the camera; determines whether the reflected infrared ray is received; and determines whether the image includes the preset face. When the reflected infrared ray is received and the image includes the face, the electronic device executes a response corresponding to the matching result. Otherwise, the electronic device skips executing a response corresponding to the matching result. Therefore, a response caused due to accidental touch of the fingerprint sensor can be prevented from being executed.

Figure 9A:
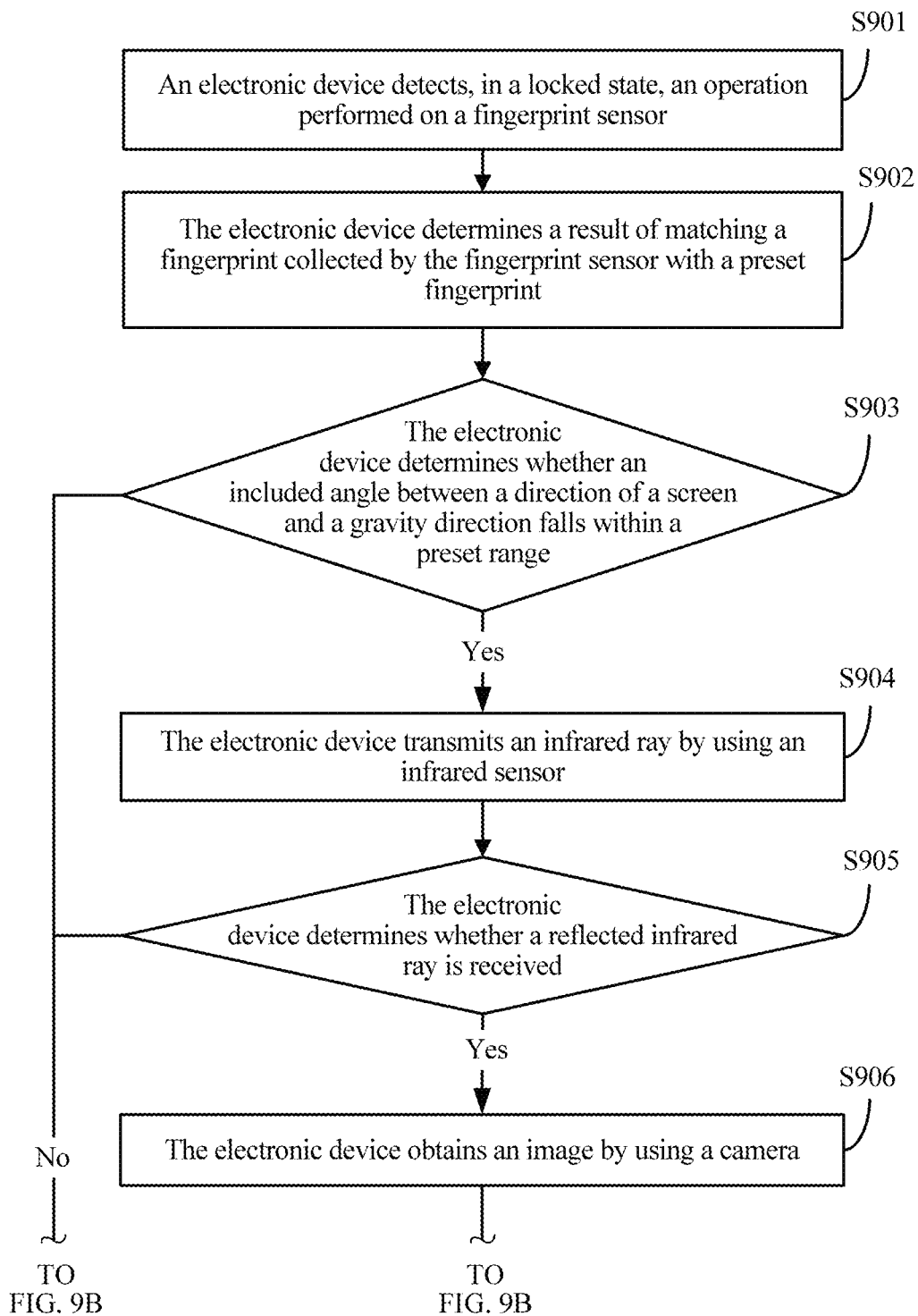
FIG. 9A and FIG. 9B are a schematic flowchart of a processing method according to another embodiment of the present invention.
Figure 9B:
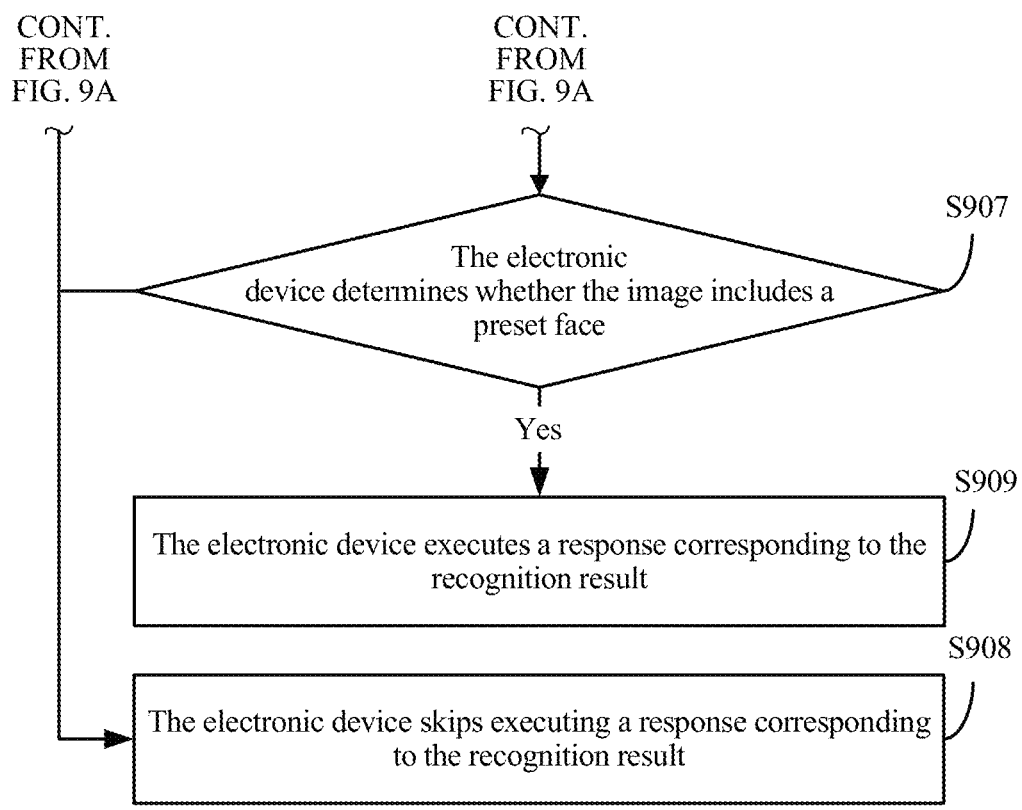

Referring to FIG. 9A and FIG. 9B, FIG. 9A and FIG. 9B are a schematic flowchart of a processing method according to another embodiment of the present invention. The processing method provided in this embodiment of the present invention is applied to an electronic device having a fingerprint sensor, an infrared sensor, and a screen. As shown in FIG. 9A and FIG. 9B, the method may include the following content.

Steps S901 to S903 are the same as steps S301 to S303. For specific details, refer to the foregoing corresponding content. Details are not described herein again.

Steps S904 and S905 are the same as steps S503 and S504. For specific details, refer to the foregoing corresponding content. Details are not described herein again. Steps S906 and S907 are the same as steps S403 and S404. For specific details, refer to the foregoing corresponding content. Details are not described herein again.

It should be understood that step S903, step S904, and step S906 may be simultaneously performed; or step S903 may be performed before step S904 and step S906; or step S904 is performed before step S903 and step S906. There is no strict execution sequence between these three steps. This is not intended to limit the present invention.

For example, the electronic device may determine whether an included angle between a direction of the screen and a gravity direction falls within a preset range. When the included angle between the direction of the screen and the gravity direction falls beyond the preset range, step S908 is performed; or when the included angle between the direction of the screen and the gravity direction falls within the preset range, the electronic device transmits an infrared ray by using the infrared sensor, and determines whether a reflected infrared ray is received. When the reflected infrared ray is not received, step S908 is performed; or when the reflected infrared ray is received, the electronic device obtains an image by using a camera, and determines whether the image includes a preset face. When the image does not include the preset face, step S908 is performed; or when the image includes the preset face, step S909 is performed.

For another example, the electronic device may transmit an infrared ray by using the infrared sensor, and determine whether a reflected infrared ray is received. When the reflected infrared ray is not received, step S908 is performed; or when the reflected infrared ray is received, the electronic device determines whether an included angle between a direction of the screen and a gravity direction falls within a preset range. When the included angle between the direction of the screen and the gravity direction falls beyond the preset range, step S908 is performed; or when the included angle between the direction of the screen and the gravity direction falls within the preset range, the electronic device obtains an image by using a camera, and determines whether the image includes a preset face. When the image does not include the preset face, step S908 is performed; or when the image includes the preset face, step S909 is performed.

For another example, after detecting an operation performed on the fingerprint sensor, the electronic device may transmit an infrared ray by using the infrared sensor, and obtain an image by using a camera, so as to determine whether a reflected infrared ray is received, determine whether the image includes a preset face, and determine whether an included angle between a direction of the screen and a gravity direction falls within a preset range. When the reflected infrared ray is received, the image includes the preset face, and the included angle between the direction of the screen and the gravity direction falls within the preset range, step S909 is performed. Alternatively, when the reflected infrared ray is not received, or when the image does not include the preset face, or when the included angle between the direction of the screen and the gravity direction falls beyond the preset range, step S908 is performed.

Steps S908 and S909 are the same as steps S304 and S305. For specific details, refer to the foregoing corresponding content. Details are not described herein again.

In this embodiment shown in FIG. 9A and FIG. 9B, the electronic device detects, in a locked state, the operation performed on the fingerprint sensor; and determines a result of matching a fingerprint collected by the fingerprint sensor with a preset fingerprint. When the included angle between the direction of the screen and the gravity direction falls within the preset range, the reflected infrared ray is received, and the image includes the preset face, the electronic device executes a response corresponding to the matching result. Otherwise, the electronic device skips executing a response corresponding to the matching result. Therefore, a response caused due to accidental touch of the fingerprint sensor can be prevented from being executed.

Figure 10:
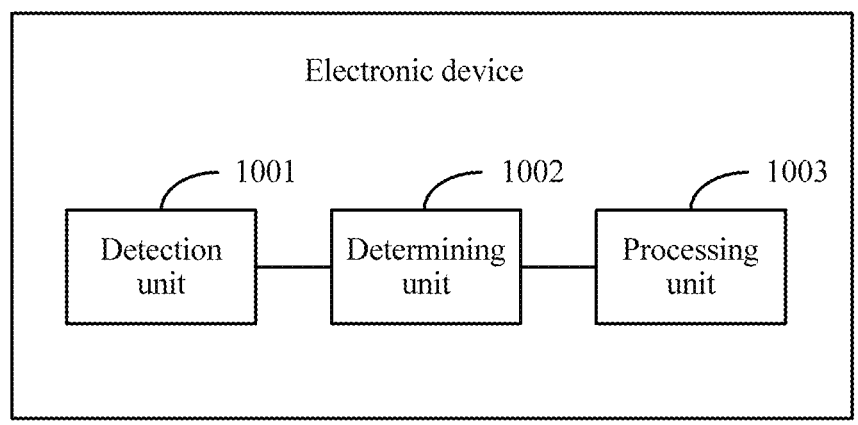
FIG. 10 is a schematic structural diagram of an electronic device according to another embodiment of the present invention.

Referring to FIG. 10, FIG. 10 is a schematic structural diagram of an electronic device according to another embodiment of the present invention. As shown in FIG. 10, the electronic device may include at least a detection unit 1001, a determining unit 1002, and a processing unit 1003.

The detection unit 1001 is configured to: when the electronic device is in a locked state, detect an operation performed on a fingerprint sensor.

The determining unit 1002 is configured to determine a result of matching a fingerprint collected by the fingerprint sensor with a preset fingerprint, where the matching result is matching or not matching.

The processing unit 1003 is configured to: when an included angle between a direction of a screen and a gravity direction falls beyond a preset range, skip executing a response corresponding to the matching result; or when an included angle between a direction of a screen and a gravity direction falls within a preset range, execute a response corresponding to the matching result.

In an optional embodiment, the processing unit 1003 executes the response corresponding to the matching result and is specifically configured to: when the matching result is matching, exit the locked state; or when the matching result is not matching, output prompt information, where the prompt information is used to indicate that the fingerprint collected by the fingerprint sensor does not match the preset fingerprint.

In an optional embodiment, the processing unit 1003 is specifically configured to: when the included angle between the direction of the screen and the gravity direction falls beyond the preset range, obtain acceleration values of the electronic device on an X axis, a Y axis, and a Z axis by using an acceleration sensor; and when each of the three obtained acceleration values is less than a corresponding preset acceleration threshold, skip executing the response corresponding to the matching result; or when any of the three obtained acceleration values is not less than a corresponding preset acceleration threshold, execute the response corresponding to the matching result.

In an optional embodiment, the preset range includes a first preset range, a second preset range, a third preset range, and a fourth preset range. In this case, the processing unit 1003 is specifically configured to: when the included angle between the direction of the screen and the gravity direction falls beyond the first preset range, the second preset range, the third preset range, and the fourth preset range, determine that the included angle between the direction of the screen and the gravity direction falls beyond the preset range; or when the included angle between the direction of the screen and the gravity direction falls within the first preset range, the second preset range, the third preset range, or the fourth preset range, determine that the included angle between the direction of the screen and the gravity direction falls within the preset range.

Optionally, the preset range includes a first preset range and a second preset range. The first preset range is used when the electronic device is in a motion state, and the second preset range is used when the electronic device is in a stationary state.

Optionally, the preset range includes a first preset range, a second preset range, a third preset range, and a fourth preset range. The first preset range is used when a user holding the electronic device is in a walking, running, standing, or sitting posture, the second preset range is used when the user holding the electronic device is in a prone posture, the second preset range is used when the user holding the electronic device is in a supine posture, and the second preset range is used when the user holding the electronic device is in a side-lying posture. In an optional embodiment, the included angle between the direction of the screen and the gravity direction is determined by using data collected by at least one of a geomagnetic sensor, an angular velocity sensor, or the acceleration sensor.

In an optional embodiment, after skipping executing the response corresponding to the matching result, the processing unit 1003 is further configured to: when a quantity of operations detected in preset duration and performed on the fingerprint sensor exceeds a preset quantity value, determine a matching result of the operation detected in the preset duration; and when the matching result is matching, execute a response corresponding to the matching.

In an optional embodiment, after skipping executing the response corresponding to the matching result, the processing unit 1003 is further configured to: when a quantity of operations detected in preset duration and performed on the fingerprint sensor exceeds a preset quantity value, determine a matching result of a last operation detected in the preset duration; and execute a response corresponding to the matching result of the last operation.

It should be noted that the detection unit 1001 in this embodiment of the present invention may be replaced with the input unit 11 in FIG. 1, and the determining unit 1002 and the processing unit 1003 may be replaced with the processor 12 in FIG. 1. This is not specifically limited in this embodiment of the present invention.

It should be understood that in this implementation, functions of all function modules of the electronic device may be specifically implemented according to the method in the method embodiment shown in FIG. 3, FIG. 6, FIG. 7, or FIG. 9A and FIG. 9B; and may be specifically corresponding to related descriptions in FIG. 3, FIG. 6, FIG. 7, or FIG. 9A and FIG. 9B. Details are not described herein again.

In a possible design, the detection unit 1001 is configured to: when the electronic device is in a locked state, detect an operation performed on a fingerprint sensor.

The determining unit 1002 is configured to determine a result of matching a fingerprint collected by the fingerprint sensor with a preset fingerprint, where the matching result is matching or not matching.

The processing unit 1003 is configured to: when an image obtained by a camera does not include a preset face, skip executing a response corresponding to the matching result; or when an image obtained by a camera includes a preset face, execute a response corresponding to the matching result.

It should be noted that the detection unit 1001 in this embodiment of the present invention may be replaced with the input unit 11 in FIG. 1, and the determining unit 1002 and the processing unit 1003 may be replaced with the processor 12 in FIG. 1. This is not specifically limited in this embodiment of the present invention.

It can be understood that in this implementation, functions of all function modules of the electronic device may be specifically implemented according to the methods in the method embodiments shown in FIG. 4, FIG. 6, FIG. 8, and FIG. 9A and FIG. 9B; and may be specifically corresponding to related descriptions in FIG. 4, FIG. 6, FIG. 8, and FIG. 9A and FIG. 9B. Details are not described herein again.

Figure 11:
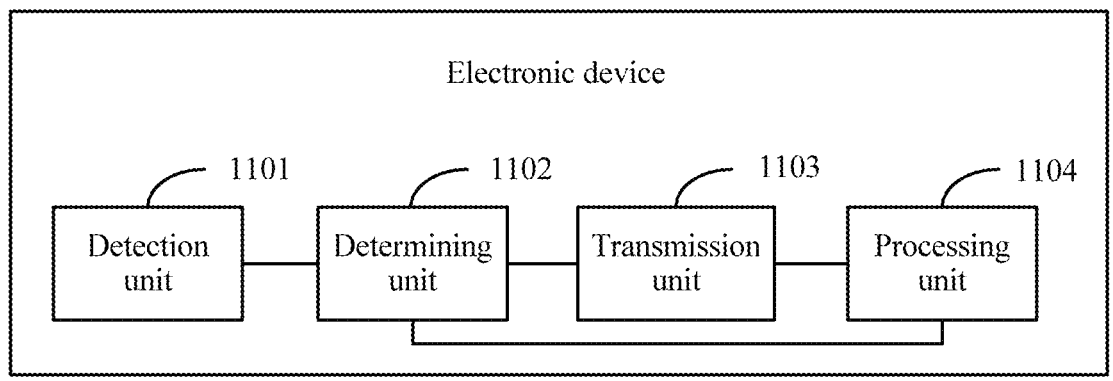
FIG. 11 is a schematic structural diagram of an electronic device according to another embodiment of the present invention.

Referring to FIG. 11, FIG. 11 is a schematic structural diagram of an electronic device according to another embodiment of the present invention. As shown in FIG. 11, the electronic device may include at least a detection unit 1101, a determining unit 1102, a transmission unit 1103, and a processing unit 1104.

The detection unit 1101 is configured to: when the electronic device is in a locked state, detect an operation performed on a fingerprint sensor.

The determining unit 1102 is configured to determine a result of matching a fingerprint collected by the fingerprint sensor with a preset fingerprint, where the matching result is matching or not matching.

The transmission unit 1103 is configured to transmit an infrared ray by using an infrared sensor.

The processing unit 1104 is configured to: when a reflected infrared ray is not received, skip executing a response corresponding to the matching result; or when a reflected infrared ray is received, execute a response corresponding to the matching result.

It should be noted that the detection unit 1101 in this embodiment of the present invention may be replaced with the input unit 11 in FIG. 1, the transmission unit 1103 may be replaced with the output unit 13 in FIG. 1, and the determining unit 1102 and the processing unit 1104 may be replaced with the processor 12 in FIG. 1. This is not specifically limited in this embodiment of the present invention.

It can be understood that in this implementation, functions of all function modules of the electronic device may be specifically implemented according to the methods in the method embodiments shown in FIG. 5, and FIG. 7 to FIG. 9A and FIG. 9B; and may be specifically corresponding to related descriptions in FIG. 5, and FIG. 7 to FIG. 9A and FIG. 9B. Details are not described herein again.

It should be noted that in the foregoing embodiments, the description of each embodiment has respective focuses. For a part that is not described in detail in an embodiment, refer to related descriptions in other embodiments. In addition, a person skilled in the aft should also understand that all the embodiments described in this specification belong to preferred embodiments, and the involved actions and modules are not necessarily mandatory to the embodiments of the present invention.

Steps in the method in the embodiments of the present invention may be sequentially adjusted, combined, and deleted according to a practical requirement.

Units in the apparatus in the embodiments of the present invention may be combined, divided, and deleted according to a practical requirement.

The units in the embodiments of the present invention may be implemented by using a universal integrated circuit, such as a CPU (Central Processing Unit) or an ASIC (Application Specific Integrated Circuit).

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The storage medium may be a magnetic disk, an optical disc, a read-only memory (ROM), a random access memory (RAM), or the like.

What is disclosed above is merely example embodiments of the present invention, and certainly is not intended to limit the protection scope of the present invention. Therefore, equivalent variations made in accordance with the claims of the present invention shall fall within the scope of the present invention.

What is claimed is:

1. A processing method comprising:
    collecting a fingerprint on a fingerprint sensor of an electronic device, when the electronic device, while in a locked state, detects an operation being performed on the fingerprint sensor;
    determining whether the collected fingerprint matches a preset fingerprint;
    when an included angle between a direction of a screen on the electronic device and a gravity direction falls beyond a preset range, skipping an execution of a response corresponding to an outcome of the determination; and
    when the included angle between the direction of the screen and the gravity direction falls within the preset range, executing the response corresponding to the outcome of the determination.

2. The processing method according to claim 1, wherein executing the response comprises:
    when the collected fingerprint matches the preset fingerprint, exiting the locked state; and
    when there is a mismatch between the collected fingerprint and the preset fingerprint, outputting prompt information, wherein the prompt information indicates that the collected fingerprint does not match the preset fingerprint.

3. The processing method according to claim 1, wherein, when the included angle between the direction of the screen and the gravity direction falls beyond the preset range, the method further comprises:
  obtaining, by an acceleration sensor in the electronic device, an acceleration value of the electronic device on each of an X axis, a Y axis, and a Z axis;
  when each obtained acceleration value is less than a corresponding preset acceleration threshold, skipping the execution of the response corresponding to the outcome of the determination; and
  when any obtained acceleration value is equal to or greater than the corresponding preset acceleration threshold, executing the response corresponding to the outcome of the determination.

4. The processing method according to claim 1, further comprising:
  determining the included angle between the direction of the screen and the gravity direction according to data collected by a geomagnetic sensor in the electronic device, by an angular velocity sensor in the electronic device, or by an acceleration sensor.

5. The processing method according to claim 1, further comprising, after skipping the execution of the response:
  determining a quantity of a plurality of other operations that are detected as being performed on the fingerprint sensor during a preset duration; and
  when the quantity exceeds a preset quantity value:
    collecting another fingerprint on the fingerprint sensor, from one of the plurality of other operations;
    determining whether the other collected fingerprint matches the preset fingerprint; and
    executing the response corresponding to an outcome of the determination for the other collected fingerprint.

6. The processing method according to claim 5, wherein the one of the plurality of other operations comprises a last operation of the plurality of other operations.

7. The processing method according to claim 1, wherein the preset range comprises a first preset range or a second preset range;
  wherein the preset range comprises the first preset range when the electronic device is in a motion state; and
  wherein the preset range comprises the second preset range when the electronic device is in a stationary state.

8. The processing method according to claim 1, wherein the preset range comprises a first preset range, a second preset range, a third preset range, or a fourth preset range;
  wherein the preset range comprises the first preset range, when a user of the electronic device is walking, running, or when the user is in a standing or sitting posture;
  wherein the preset range comprises the second preset range, when the user is in a prone posture;
  wherein the preset range comprises the third preset range, when the user is in a supine posture; and
  wherein the preset range comprises the fourth preset range when the user is in a side-lying posture.

9. An electronic device, comprising:
  a fingerprint sensor;
  a screen;
  a processor coupled to the fingerprint sensor and the screen; and
  a non-transitory computer-readable storage medium coupled to the processor and storing a program for execution by the processor;
  wherein the program includes instructions to:
    collect a fingerprint on the fingerprint sensor, when the electronic device, while in a locked state, detects an operation being performed on the fingerprint sensor;
    determine whether the collected fingerprint matches a preset fingerprint;
    when an included angle between a direction of the screen and a gravity direction falls beyond a preset range, skip an execution of a response corresponding to an outcome of the determination; and
    when the included angle between the direction of the screen and the gravity direction falls within the preset range, execute the response corresponding to the outcome of the determination.

10. The electronic device according to claim 9, wherein the instructions to execute the response comprise instructions to:
  when the collected fingerprint matches the preset fingerprint, exit the locked state; and
  when there is a mismatch between the collected fingerprint and the preset fingerprint, output prompt information, wherein the prompt information indicates that the fingerprint collected by the fingerprint sensor does not match the preset fingerprint.

11. The electronic device according to claim 9, further comprising an acceleration sensor coupled to the processor;
  wherein, when the included angle between the direction of the screen and the gravity direction falls beyond the preset range, the program further comprises instructions to:
  obtain an acceleration value of the electronic device on each of an X axis, a Y axis, and a Z axis from the acceleration sensor;
  when each obtained acceleration value is less than a corresponding preset acceleration threshold, skip the execution of the response corresponding to the outcome of the determination; and
  when any obtained acceleration value is equal to or greater than the corresponding preset acceleration threshold, execute the response corresponding to the outcome of the determination.

12. The electronic device according to claim 9, further comprising another sensor coupled to the processor, wherein the other sensor comprises a geomagnetic sensor, an angular velocity sensor, or an acceleration sensor; and
  wherein the program further comprises instructions to determine the included angle between the direction of the screen and the gravity direction according to data collected by the other sensor.

13. The electronic device according to claim 9, wherein the program further comprises, after the instructions to skip the execution of the response, instructions to:
  determine a quantity of a plurality of other operations that are detected as being performed on the fingerprint sensor during a preset duration; and
  when the quantity exceeds a preset quantity value:
    collect another fingerprint on the fingerprint sensor, from one of the plurality of other operations;
    determine whether the other collected fingerprint matches the preset fingerprint; and
    execute the response corresponding to an outcome of the determination for the other collected fingerprint.

14. The electronic device according to claim 13, wherein the one of the plurality of other operations comprises a last operation of the plurality of other operations.

15. The electronic device according to claim 9, wherein the preset range comprises a first preset range or a second preset range;

wherein the preset range comprises the first preset range when the electronic device is in a motion state; and wherein the preset range comprises the second preset range when the electronic device is in a stationary state.

16. The electronic device according to claim 9, wherein the preset range comprises a first preset range, a second preset range, a third preset range, or a fourth preset range;

wherein the preset range comprises the first preset range when a user of the electronic device is walking or running, or when the user is in a standing or sitting posture;

wherein the preset range comprises the second preset range when the user is in a prone posture;

wherein the preset range comprises the third preset range when the user is in a supine posture; and wherein the preset range comprises the fourth preset range when the user is in a side-lying posture.

17. A non-transitory computer readable storage medium storing one or more programs, wherein the one or more programs comprise an instruction, wherein when executed by an electronic device, the instructions enables the electronic device to implement the following operations:

collecting a fingerprint sensed on the electronic device, when the electronic device, while in a locked state, detects an operation being performed thereon;

determining whether the collected fingerprint matches a preset fingerprint; and when an included angle between a direction of a screen on the electronic device and a gravity direction falls beyond a preset range, skipping an execution of a response corresponding to an outcome of the determination; and when the included angle between the direction of the screen and the gravity direction falls within the preset range, executing the response corresponding to the outcome of the determination.

18. The non-transitory computer readable storage medium according to claim 17, wherein executing the response comprises:

when the collected fingerprint matches the preset fingerprint, exiting the locked state; and when there is a mismatch between the collected fingerprint and the preset fingerprint, outputting prompt information, wherein the prompt information is used to indicate that the collected fingerprint does not match the preset fingerprint.

19. The non-transitory computer readable storage medium according to claim 17, wherein when executed by the electronic device, the instructions further enables the electronic device to implement the following operations, when the included angle between the direction of the screen and the gravity direction falls beyond the preset range:

obtaining an acceleration value of the electronic device on each of an X axis, a Y axis, and a Z axis;

when each acceleration value is less than a corresponding preset acceleration threshold, skipping the execution of the response corresponding to the outcome of the determination; and when any acceleration value is greater than or equal to the corresponding preset acceleration threshold, executing the response corresponding to the outcome of the determination.

20. The non-transitory computer readable storage medium according to claim 17, wherein, when executed by the electronic device, the instructions further enable the electronic device to implement the following operation: determining the included angle between the direction of the screen and the gravity direction according to data collected by a sensor in the electronic device.

21. The non-transitory computer readable storage medium according to claim 17, wherein, when executed by the electronic device, the instructions further enables the electronic device to implement the following operations after skipping the execution of the response:

determining a quantity of a plurality of other operations that are detected as being performed on the electronic device during a preset duration; and when the quantity exceeds a preset quantity value:
collecting another fingerprint from one of the plurality of other operations;
determining whether the collected fingerprint matches the preset fingerprint; and
executing the response corresponding to an outcome of the determination for the other collected fingerprint.

* * * * *